United States Patent
Alaql et al.

(10) Patent No.: US 11,341,283 B2
(45) Date of Patent: May 24, 2022

(54) LEARNING GUIDED OBFUSCATION FRAMEWORK FOR HARDWARE IP PROTECTION

(71) Applicant: University of Florida Research Foundation, Incorporated, Gainesville, FL (US)

(72) Inventors: Abdulrahman Alaql, Gainesville, FL (US); Saranyu Chattopadhyay, Gainesville, FL (US); Swarup Bhunia, Gainesville, FL (US); Prabuddha Chakraborty, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 51 days.

(21) Appl. No.: 17/101,153

(22) Filed: Nov. 23, 2020

(65) Prior Publication Data

US 2021/0173963 A1    Jun. 10, 2021

Related U.S. Application Data

(60) Provisional application No. 62/943,922, filed on Dec. 5, 2019.

(51) Int. Cl.
    *G06F 21/75* (2013.01)
(52) U.S. Cl.
    CPC .................................. *G06F 21/75* (2013.01)
(58) Field of Classification Search
    CPC ...................................................... G06F 21/75
    See application file for complete search history.

(56) References Cited

U.S. PATENT DOCUMENTS 10,776,522 B1 * 9/2020 McNeil ................. H04L 9/3247
10,853,523 B2 * 12/2020 Sinanoglu ............... G06F 21/75
(Continued)

OTHER PUBLICATIONS

Travis Meade, et al "IP protection through gate-level netlist security enhancement, Integration", vol. 58, 2017, pp. 563-570, ISSN 0167-9260, https://doi.org/10.1016/j.vlsi.2016.10.014. (https://www.sciencedirect.com/science/article/pii/S0167926016300827) (Year: 2017).*

(Continued)

*Primary Examiner* — Aravind K Moorthy
*Assistant Examiner* — Devin E Almeida
(74) *Attorney, Agent, or Firm* — Alston & Bird LLP

(57) ABSTRACT

Embodiments of the present disclosure provide methods, apparatus, systems, computer program products, computing devices, and/or computing entities for obfuscating a hardware intellectual property (IP) design by locking the design based at least in part on a plurality of key-bits. In one embodiment, a method is provided comprising: generating a key vulnerability matrix for a locked version of the design and a plurality of attacks that comprises for each attack, a vector comprising a value for each key-bit identifying whether the attack successfully extracted a correct key value for the key-bit; and for each key-bit: determining whether the key-bit is vulnerable to an attack based on the values in the matrix; and responsive to being vulnerable: identifying a set of solutions to mitigate the attack; selecting a solution from the set; and inserting a key-gate type for the key-bit at a location identified by the selected solution into the design.

21 Claims, 17 Drawing Sheets

(56) References Cited

U.S. PATENT DOCUMENTS

| | | | |
|---|---|---|---|
| 10,902,098 B2* | 1/2021 | Zhou | G06F 21/14 |
| 11,017,125 B2* | 5/2021 | Stitt | H04L 12/46 |
| 11,030,348 B2* | 6/2021 | Tehranipoor | G06F 30/327 |
| 11,222,098 B2* | 1/2022 | Tehranipoor | H03K 19/17768 |
| 2019/0018936 A1* | 1/2019 | Zhou | H04L 9/3239 |
| 2019/0129892 A1* | 5/2019 | Sinanoglu | G06F 21/00 |
| 2020/0065456 A1* | 2/2020 | Tehranipoor | G06F 21/14 |
| 2022/0035977 A1* | 2/2022 | Bhunia | G06F 30/398 |

OTHER PUBLICATIONS

Azar, K. et al. "SMT Attack: Next Generation Attack on Obfuscated Circuits with Capabilities and Performance Beyond the SAT Attacks". IACR Transactions on Cryptographic Hardware and Embedded Systems, 2019(1), 97-122. https://doi.org/10.13154/tches.v2019.i1. 97 (Year: 2019).*

T. Meade et al. "Gate-level netlist reverse engineering for hardware security: Control logic register identification," 2016 IEEE International Symposium on Circuits and Systems (ISCAS), 2016, pp. 1334-1337, doi: 10.1109/ISCAS.2016.7527495. (Year: 2016).*

Reshma K., et al "Hardware Trojan Detection Using Deep Learning Technique". In: Wang J., Reddy G., Prasad V., Reddy V. (eds) Soft Computing and Signal Processing. Advances in Intelligent Systems and Computing, vol. 898. Springer, Singapore, https://doi.org/10. 1007/978- (Year: 2019).*

A. Chakraborty et al., "Keynote: A Disquisition on Logic Locking," in IEEE Transactions on Computer-Aided Design of Integrated Circuits and Systems, vol. 39, No. 10, pp. 1952-1972, Oct. 2020, doi: 10.1109/TCAD.2019.2944586. (Year: 2020).*

M. Tanjidur Rahman et al., "Defense-in-depth: A recipe for logic locking to prevail", Integration, vol. 72, 2020, pp. 39-57, ISSN 0167-9260, https://doi.org/10.1016/j.vlsi.2019.12.007 (Year: 2020).*

OECD. "The Economic Impact of Counterfeiting and Piracy: Executive Summary," In *Organisation for Economic Co-operation and Development*, (2007), (29 pages).

Roy, Jarrod A. et al. "EPIC: Ending Piracy of Integrated Circuits," *In 2008 Design, Automation and Test in Europe*, (6 pages), Mar. 10-14, 2008. DOI: 10.H09/DATE.2008.4484823.

Chakraborty, Rajat Subhra et al. "Hardware Protection and Authentication through Netlist Level Obfuscation," *In 2008 IEEE/ACM International Conference on Computer-Aided Design*, Nov. 10, 2008, pp. 674-677. IEEE.

Subramanyan, Pramod et al. "Evaluating the Security of Logic Encryption Algorithms," *In 2015 IEEE International Symposium on Hardware Oriented Security and Trust (HOST)*, May 5, 2015, pp. 137-143. IEEE.

Chakraborty, Prabuddha et al. "SAIL: Machine Learning Guided Structural Analysis Attack on Hardware Obfuscation," *In Asian Hardware Oriented Security and Trust Symposium (AsianHOST)*, Dec. 17, 2018, pp. 56-61. IEEE.

Yasin, Muhammad et al. "On Improving The Security of Logic Locking," *In IEEE Transactions on Computer-Aided Design of Integrated Circuits and Systems*, vol. 35, No. 9, Sep. 2016, pp. 1411-1424.

Lee, Yu-Wei et al. "Improving Logic Obfuscation Via Logic Cone Analysis," *In 2015 16th Latin-American Test Symposium (LATS)*, Mar. 25, 2015, (6 pages). IEEE.

Yasin, Muhammad et al. "SARLock: SAT Attack Resistant Logic Locking," *In 2016 IEEE International Symposium on Hardware Oriented Security and Trust (HOST)*, May 3, 2016, pp. 236-241. IEEE.

Plaza, Stephen M. et al. "Solving The Third-Shift Problem in IC Piracy With Test-Aware Logic Locking," *In IEEE Transactions on Computer-Aided Design of Integrated Circuits and Systems*, vol. 34, No. 6, Jun. 2015, pp. 961-971.

Xu, Xiaolin et al. "Novel Bypass Attack and BDD-Based Tradeoff Analysis Against All Known Logic Locking Attacks," *In International Conference on Cryptographic Hardware and Embedded Systems*, Sep. 25, 2017, (21 pages). Springer, Cham, Switzerland.

Shannon, C.E. "Communication Theory of Secrecy Systems," *In Bell System Technical Journal*, vol. 28, No. 4, Oct. 1949, pp. 656-715.

Mitchell, David et al. "Hard and Easy Distributions of SAT Problems," *In AAAI*, vol. 92, Jul. 12, 1992, pp. 459-465.

Shamsi, Kaveh et al. "AppSAT: Approximately Deobfuscating Integrated Circuits," *In IEEE International Symposium on Hardware Oriented Security and Trust (HOST)*, May 1, 2017, pp. 95-100. IEEE.

Xie, Yang et al. "Mitigating SAT Attack on Logic Locking," *In International Conference on Cryptographic Hardware and Embedded Systems*, (2016), (19 pages).

Xie, Yang et al. "Anti-SAT: Mitigating SAT attack on logic locking," *IEEE Transactions on Computer-Aided Design of Integrated Circuits and Systems*, vol. 38, No. 2, Feb. 2, 2018, pp. 199-207. DOI: 10.1109/TCAD.2018.2801220.

Yasin, Muhammad et al. "Security Analysis of Anti-SAT," *IEEE Asia and South Pacific Design Automation Conference (ASP-DAC)*, Jan. 16, 2017, pp. 342-347. IEEE.

Yasin, Muhammad et al. "Provably-Secure Logic Locking: From Theory To Practice," *In Proceedings of the 2017 ACM SIGSAC Conference on Computer and Communications Security*, 2017, pp. 1601-1618, Nov. 3, 2017, Dallas, TX.

Sirone, Deepak et al. "Functional Analysis Attacks on Logic Locking," *In arXiv preprint arXiv:1811.12088v1*, Nov. 29, 2018, (17 pages).

Sirone, Deepak et al. "Functional Analysis Attacks on Logic Locking," *2019 Design, Automation & Test in Europe Conference & Exhibition*, Mar. 25-29, 2019, pp. 936-939, Florence, Italy, DOI: 10.23919/DATE.2019.8715163.

Kamali, Hadi Mardani et al. "Full-Lock: Hard Distributions of SAT Instances For Obfuscating Circuits Using Fully Configurable Logic and Routing Blocks," *In Proceedings of the 56th Annual Design Automation Conference 2019*, Jun. 2, 2019 (6 pages).

Karypis, George et al. "Multilevel Hypergraph Partitioning: Applications in VLSI Domain," *In IEEE Transactions on Very Large Scale Integration (VLSI) Systems*, vol. 7, No. 1, Mar. 1999, pp. 69-79.

* cited by examiner

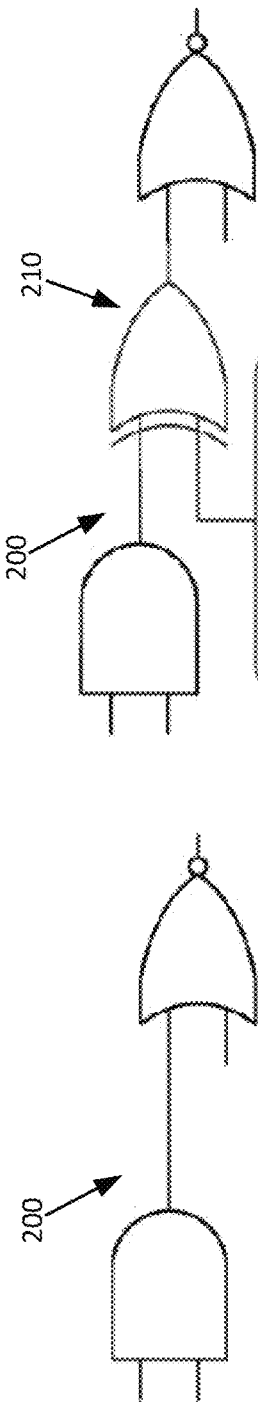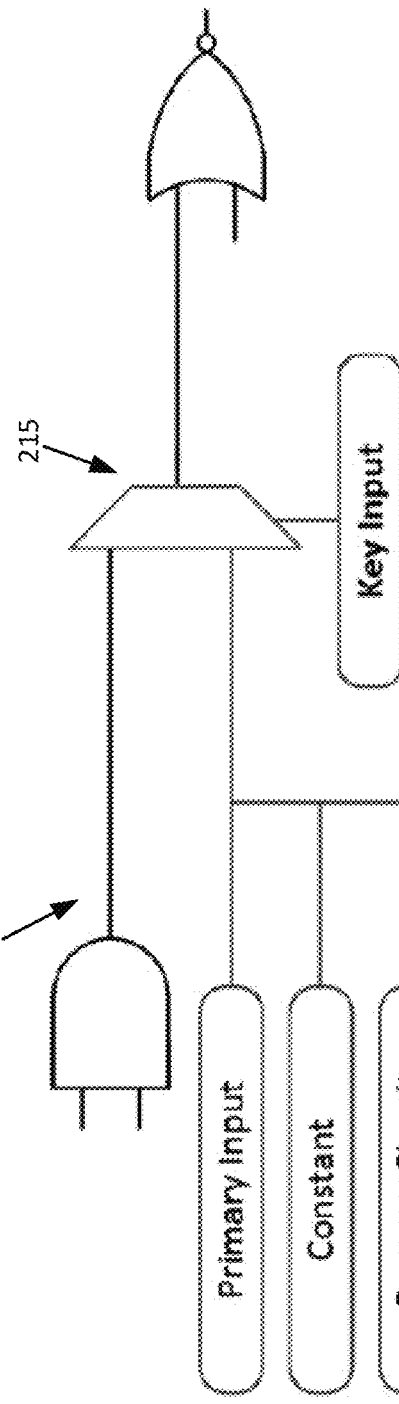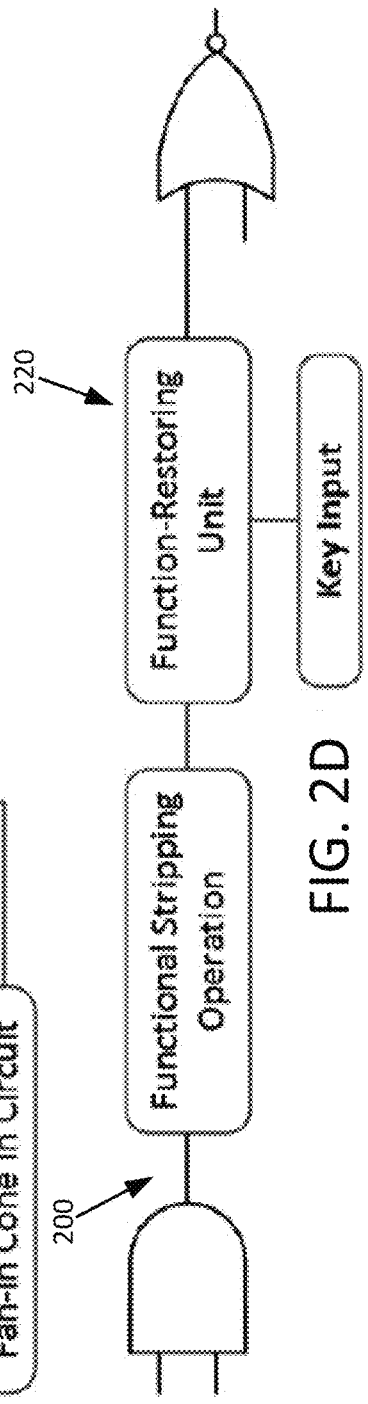

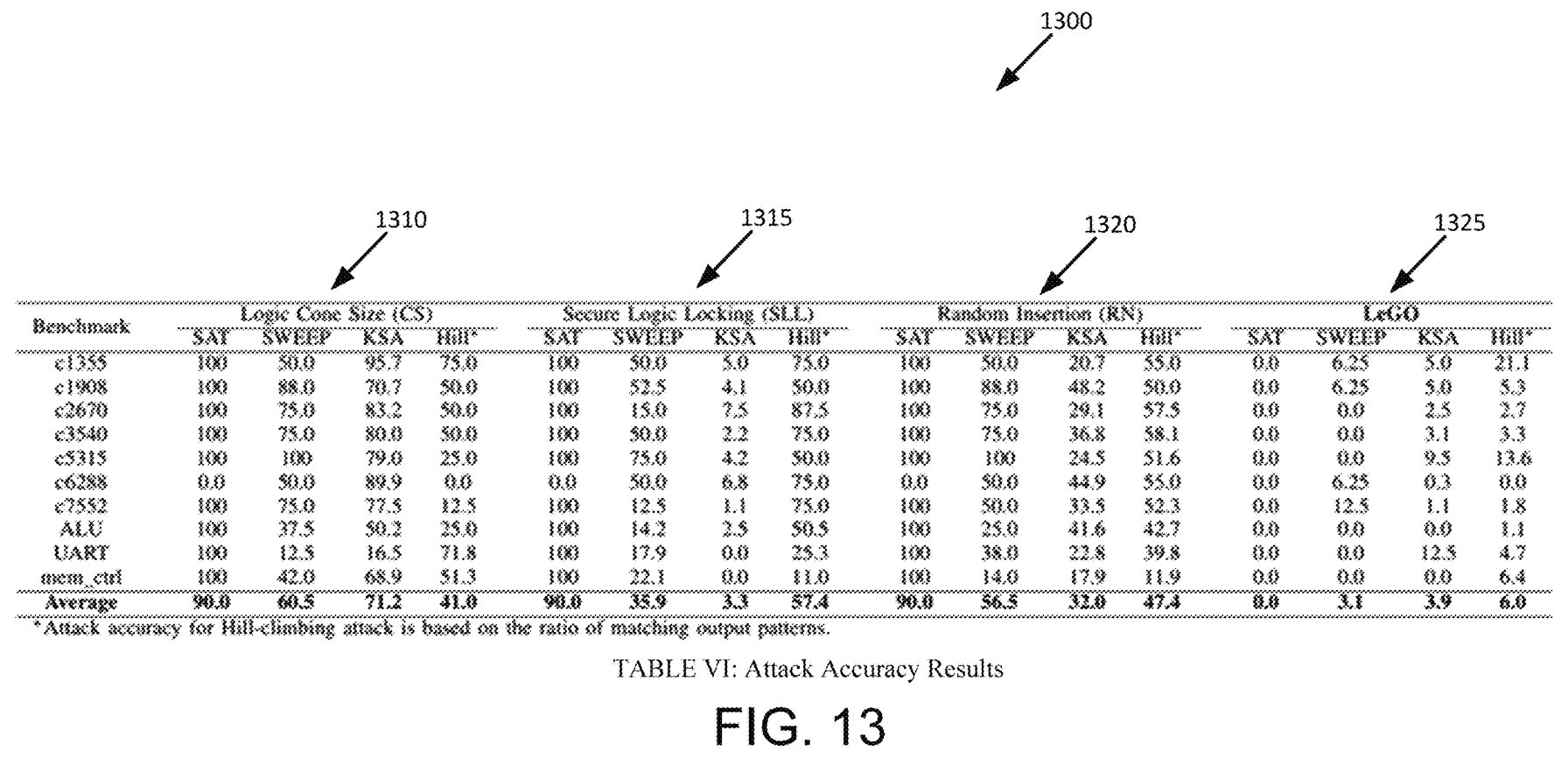

TABLE VI: Attack Accuracy Results

| Benchmark | Overhead (Tier 3) | | | | Overhead (Tier 4) | | | | Overhead (Tier 5) | | | |
|---|---|---|---|---|---|---|---|---|---|---|---|---|
| | Overhead (%) | SAT Iterations | SAT Runtime† (years) | | Overhead (%) | SAT Iterations | SAT Runtime† (years) | | Overhead (%) | SAT Iterations | SAT Runtime† (years) | |
| c1355 | 28.1 / 54.6 / 15.8 | 262340 | 8.7 | | 41.1 / 90.5 / 15.7 | 2098988 | 35.9 | | 52.0 / 131.0 / 16.3 | 4197284 | 190.8 | |
| c1908 | 39.0 / 46.0 / 15.6 | 262980 | 6.2 | | 61.4 / 85.0 / 15.5 | 2100943 | 24.4 | | 84.4 / 140.1 / 15.6 | 4201338 | 144.9 | |
| c2670 | 34.1 / 43.5 / 14.1 | 526580 | 164.7 | | 70.4 / 87.6 / 14.8 | 4198588 | 648.1 | | 131.4 / 158.9 / 16.4 | 8397987 | 3847.4 | |
| c3540 | 58.6 / 67.9 / 15.7 | 2098992 | 43303.0 | | 105.4 / 126.9 / 15.9 | 4199827 | 15634.3 | | 168.5 / 211.8 / 15.2 | 8399384 | 86947.8 | |
| c5315 | 64.8 / 42.3 / 15.6 | 2100936 | 12411.3 | | 121.5 / 64.7 / 15.7 | 4225146 | 48182.3 | | 203.5 / 86.0 / 15.7 | 8450369 | 2824.39.7 | |
| c6288 | 17.1 / 19.4 / 15.8 | 4198516 | 69485.8 | | 31.9 / 31.1 / 16.1 | 16774385 | 266986.8 | | 53.2 / 43.8 / 15.4 | 33549529 | 1559823.6 | |
| c7552 | 61.8 / 49.1 / 14.2 | 4199872 | 78915.1 | | 100.3 / 97.2 / 18.9 | 16790534 | 313834.7 | | 142.8 / 173.2 / 19.7 | 33581984 | 1875748.2 | |
| ALU | 27.7 / 39.3 / 15.6 | 4225192 | 467225.4 | | 40.4 / 63.6 / 15.9 | 16790692 | 1725948.5 | | 50.9 / 90.2 / 15.3 | 33586735 | 9827617.1 | |
| UART | 34.2 / 41.8 / 15.9 | 16774780 | 586894.8 | | 53.3 / 83.1 / 15.7 | 33581756 | 2449970.1 | | 72.5 / 148.7 / 15.1 | 67168984 | 15127247.7 | |
| mem_ctrl | 24.5 / 43.8 / 15.8 | 16790692 | 826063.1 | | 47.9 / 70.6 / 15.1 | 33589338 | 3485074.2 | | 84.3 / 99.8 / 15.7 | 67162768 | 21673313.7 | |
| Average | 38.9 / 44.7 / 15.3 | 5144078 | 204556.5 | | 67.3 / 80.0 / 15.9 | 13428018.7 | 8306236 | | 104.3 / 128.3 / 16.0 | 26869686.2 | 50437320 | |

† Estimated runtimes based on the complexity analysis in Tables II and III.

TABLE VIII: Area | Power | Delay Overheads and SAT Attack Complexity Results

FIG. 15

LEARNING GUIDED OBFUSCATION FRAMEWORK FOR HARDWARE IP PROTECTION

CROSS-REFERENCE TO RELATED APPLICATIONS

This application claims the benefit of U.S. Provisional Patent Application Ser. No. 62/943,922, filed Dec. 5, 2019, which is incorporated herein by reference in its entirety, including any figures, tables, and drawings.

GOVERNMENT SUPPORT

This invention was made with government support under 1603483 awarded by The National Science Foundation and 1623310 awarded by The National Science Foundation. The government has certain rights in the invention.

TECHNICAL FIELD

The present application relates generally to hardware obfuscation, and, more specifically to systems, methods, and the like for guided obfuscation of hardware intellectual property.

BACKGROUND

The ability of the semiconductor industry to design, manufacture, and market innovative products in an ever-decreasing production time and reduced cost has resulted in the rapid expansion of human dependency on electronic systems. This significant cutback of production time and cost has been achieved by outsourcing various supply chain stages to specialized third-parties across the globe. When a design house or intellectual property (IP) vendor sends a hardware IP to an untrusted party, e.g., an untrusted foundry, it is vulnerable to various attacks, including piracy, reverse-engineering, and malicious alteration. Traditional protection methods such as encryption, which work well in preventing certain attacks for software IPs, have been considered. However, these methods are often inapplicable for hardware IPs due to the requirement of white-box accessibility by untrusted vendors during the design, verification, integration, and fabrication process.

Thus, the development of robust protection methods for hardware IPs has garnered significant attention over the past decade. A highly attractive and potent solution to this issue that has been investigated over the past decade is to perform hardware obfuscation. Obfuscation is applied to the IP at different development stages to hide the design intent of the IP and/or disable/lock the functionality to prevent black-box usage or piracy. A number of obfuscation approaches have been proposed to date, covering various abstraction levels: from register transfer-level (RTL) to the integrated circuit (IC) layout stage. Each obfuscation process has its own strengths and weaknesses, which prompts the need to perform obfuscation that is resilient to known attacks. For instance, the field of combinational logic locking has grown significantly over the past decade with vast contributions in both locking processes as well as attacks on them. Research in this active field has progressed like a cat-and-mouse game, where a successful attack on an otherwise robust design has been followed by point solutions to address them, only to be broken by new attacks.

Therefore, a need exists in the art for a unified framework to perform a robust logic locking solution by considering a wide range of available attacks and corresponding countermeasures. Moreover, a need exists for an attack suite that is flexible to account for future attacks. It is with respect to these considers and other that the disclosure herein is presented.

BRIEF SUMMARY

In general, embodiments of the present disclosure provide methods, apparatus, systems, computer program products, computing devices, computing entities, and/or the like for obfuscating a hardware intellectual property (IP) design by locking the hardware IP design based at least in part on a plurality of key-bits. In accordance with one aspect of the present disclosure, a method for obfuscating a hardware intellectual property (IP) design by locking the hardware IP design based at least in part on a plurality of key-bits is provided. In various embodiments, the method comprises: performing a plurality of obfuscation iterations for the hardware IP design, wherein each of the plurality of obfuscation iterations comprises: generating a key vulnerability matrix for a locked version of the hardware IP design and a plurality of attacks that comprises for each attack of the plurality of attacks: applying the attack to the locked version of the hardware IP design; determining whether the attack successfully extracted a correct key value for each key-bit of the plurality of key-bits; and generating a vector for the key vulnerability matrix, the vector comprising a value for each key-bit of the plurality of key-bits identifying whether the attack successfully extracted the correct key value for the key-bit; and for each key-bit of the plurality of key-bits: determining whether the key-bit is vulnerable to at least one attack in the plurality of attacks based at least in part on the values found in the key vulnerability matrix for the key-bit; and responsive to the key-bit being vulnerable to the at least one attack in the plurality of attacks: de-obfuscating a key-gate used for the key-bit within the locked version of the hardware IP design; removing the key-gate from the locked version of the hardware IP design; identifying a set of design modification solutions to mitigate the at least one attack, wherein each design modification solution identifies a location within the hardware IP design and a key-gate type; selecting a selected design modification solution from the set of design modification solutions; and inserting the key-gate type to be used for the key-bit at the location identified by the selected design modification solution into the hardware IP design.

In accordance with another aspect of the present disclosure, an apparatus is provided. In various embodiments, the apparatus comprises at least one processor and at least one memory comprising computer program code. The at least one memory and the program code are configured to, with the at least one processor, cause the apparatus to: perform a plurality of obfuscation iterations for the hardware IP design, wherein each of the plurality of obfuscation iterations comprises: generate a key vulnerability matrix for a locked version of the hardware IP design and a plurality of attacks that comprises for each attack of the plurality of attacks: apply the attack to the locked version of the hardware IP design; determine whether the attack successfully extracted a correct key value for each key-bit of the plurality of key-bits; and generate a vector for the key vulnerability matrix, the vector comprising a value for each key-bit of the plurality of key-bits identifying whether the attack successfully extracted the correct key value for the key-bit; and for each key-bit of the plurality of key-bits: determine whether the key-bit is vulnerable to at least one attack in the plurality of attacks based at least in part on the values found in the key vulnerability matrix for the key-bit; and responsive to the key-bit being vulnerable to the at least one attack in the plurality of attacks: de-obfuscate a key-gate used for the key-bit within the locked version of the hardware IP design; remove the key-gate from the locked version of the hardware IP design; identify a set of design modification solutions to mitigate the at least one attack, wherein each design modification solution identifies a location within the hardware IP design and a key-gate type; select a selected design modification solution from the set of design modification solutions; and insert the key-gate type to be used for the key-bit at the location identified by the selected design modification solution into the hardware IP design.

In accordance with yet another aspect of the present disclosure, a non-transitory computer storage medium is provided. In various embodiments, the non-transitory computer storage medium comprises instructions stored thereon. The instructions being configured to cause one or more processors to at least perform operations configured to: perform a plurality of obfuscation iterations for the hardware IP design, wherein each of the plurality of obfuscation iterations comprises: generate a key vulnerability matrix for a locked version of the hardware IP design and a plurality of attacks that comprises for each attack of the plurality of attacks: apply the attack to the locked version of the hardware IP design; determine whether the attack successfully extracted a correct key value for each key-bit of the plurality of key-bits; and generate a vector for the key vulnerability matrix, the vector comprising a value for each key-bit of the plurality of key-bits identifying whether the attack successfully extracted the correct key value for the key-bit; and for each key-bit of the plurality of key-bits: determine whether the key-bit is vulnerable to at least one attack in the plurality of attacks based at least in part on the values found in the key vulnerability matrix for the key-bit; and responsive to the key-bit being vulnerable to the at least one attack in the plurality of attacks: de-obfuscate a key-gate used for the key-bit within the locked version of the hardware IP design; remove the key-gate from the locked version of the hardware IP design; identify a set of design modification solutions to mitigate the at least one attack, wherein each design modification solution identifies a location within the hardware IP design and a key-gate type; select a selected design modification solution from the set of design modification solutions; and insert the key-gate type to be used for the key-bit at the location identified by the selected design modification solution into the hardware IP design.

In particular embodiments, identifying the set of design modification solutions may involve sorting the plurality of attacks into a sorted list of attacks based at least in part on an attack severity metric for each attack of the plurality of attacks from a highest attack severity metric to a lowest attack severity metric. Here, a plurality of solution iterations may be performed, wherein each of the plurality of solution iterations comprises: selecting an attack from the sorted list of attacks, the selected attack having a next highest attack severity metric of the attacks remaining to be processed in the sorted list of attacks; selecting one or more attack mitigation rules for the selected attack; appending the one or more attack mitigation rules to a set of attack mitigation rules; generating one or more possible design modification solutions based at least in part on the set of attack mitigation rules; responsive to generating the one or more possible design modification solutions: setting the one or more possible design modification solutions as the set of design modification solutions; and responsive to at least one attack remaining to be processed in the sorted list of attacks, performing a next solution iteration of the plurality of solution iterations; and responsive to not being able to generate the one or more possible design modification solutions, exiting from performing the plurality of solution iterations.

In addition, in some embodiments, the attack severity metric is generated for each attack in the plurality of attacks by generating an accuracy for the attack for each of the plurality of obfuscation iterations performed, the accuracy based at least in part on a number of key-bits of the plurality of key-bits for which the attack successfully extracted the correct key value for the obfuscation iteration and generating the attack severity metric for the attack based at least in part on a weighting of the accuracy for the attack for each of the plurality of obfuscation iterations performed. Further, in some embodiments, the one or more possible design modification solutions are generated based at least in part on the set of attack mitigation rules by generating the one or more possible design modification solutions by inputting the set of attack mitigation rules to a model configured to perform structural and functional analysis to interpret the set of attack mitigation rules, wherein the set of attack mitigation rules comprises one or more rules used by the model to identify the key-gate type for each possible design modification solution of the one or more possible design modification solutions and one or more rules used by the model to identify the location where to insert the key-gate type for each possible design modification solution of the one or more possible design modification solutions. Accordingly, the set of attack mitigation rules are configured in particular embodiments in a grammar comprising a set of conditions and operators configured to support statements used to specify conditions for identifying the key-gate type and the location.

Further, in some embodiments, each attack in the set of attacks is applied to a benchmark IP design. After applying an attack to the benchmark IP design, a determination is made as to whether an extracted key from applying the attack matches at least a portion of an original key used in locking the benchmark IP design. The attack is placed into a first attack group in response to the extracted key matching at least the portion of the original key and placed into a second attack group in response to the extracted key not matching at least the portion of the original key. In particular embodiments, the attacks of the first attack group may be sorted according to a number of correct key-bits found in the extracted key associated with each respective attack of the first attack group. Each attack in the first attack group is applied to the benchmark IP design sequentially, wherein a de-obfuscation is performed on the benchmark IP design after each attack in the first attack group is applied to the benchmark IP design. Each attack in the second attack group is applied to the benchmark IP design in parallel after applying each attack in the first group, wherein a de-obfuscation is performed on the benchmark IP design after each attack in the second attack group is applied to the benchmark IP design to produce a de-obfuscated IP design for a set of de-obfuscated IP designs. Finally, the plurality of attacks is generated comprising the attacks found in the first attack group and the attack found in the second attack group that produces the de-obfuscated IP design in the set of de-obfuscated IP designs having a highest number of extracted key-bits.

BRIEF DESCRIPTION OF THE DRAWINGS

Figure 1:
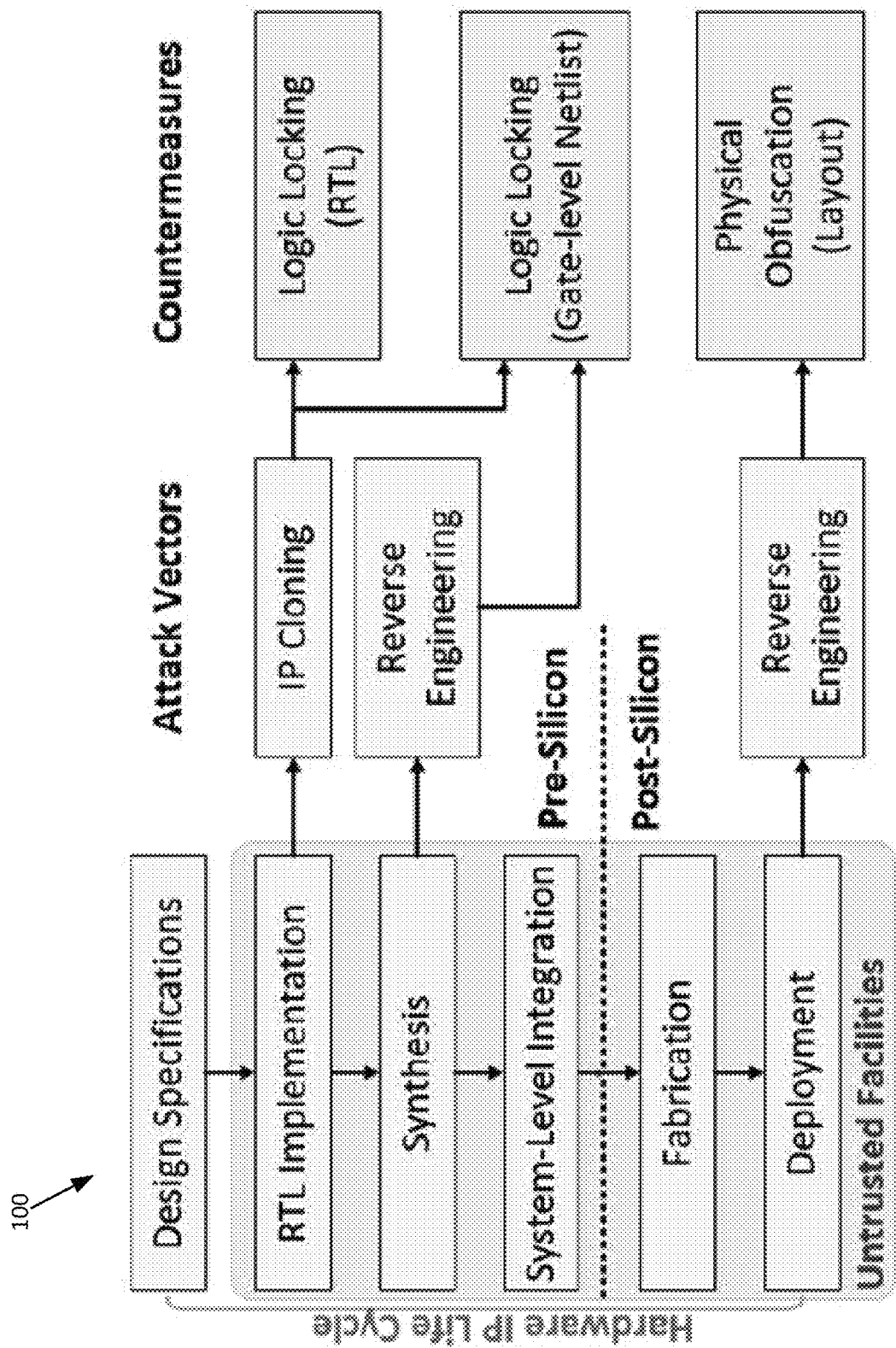

Having thus described the disclosure in general terms, reference will now be made to the accompanying drawings, which are not necessarily drawn to scale, and wherein:

FIG. 1 provides an overview of the hardware IP life span and some possible threats.

Figure 3:
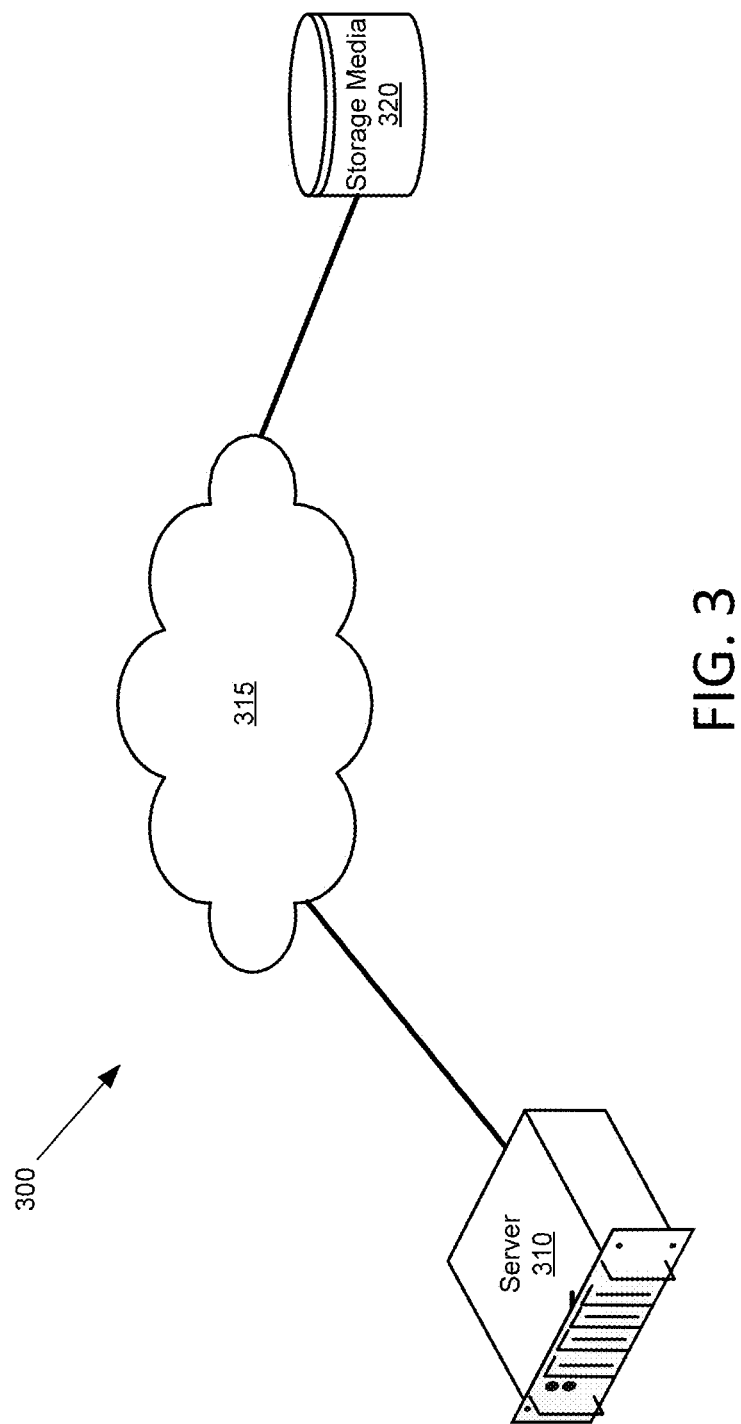
Figure 4:
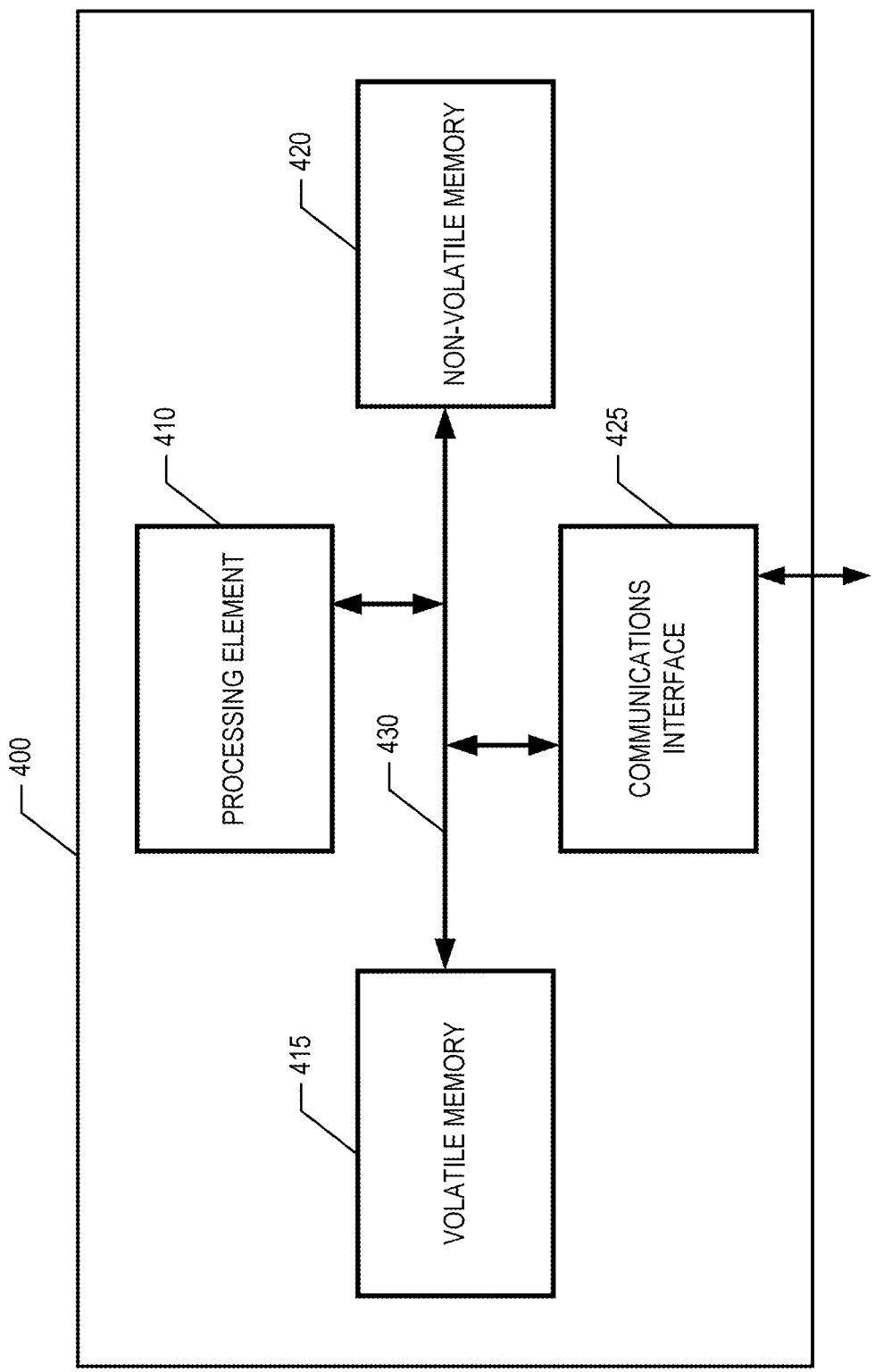
Figure 5:
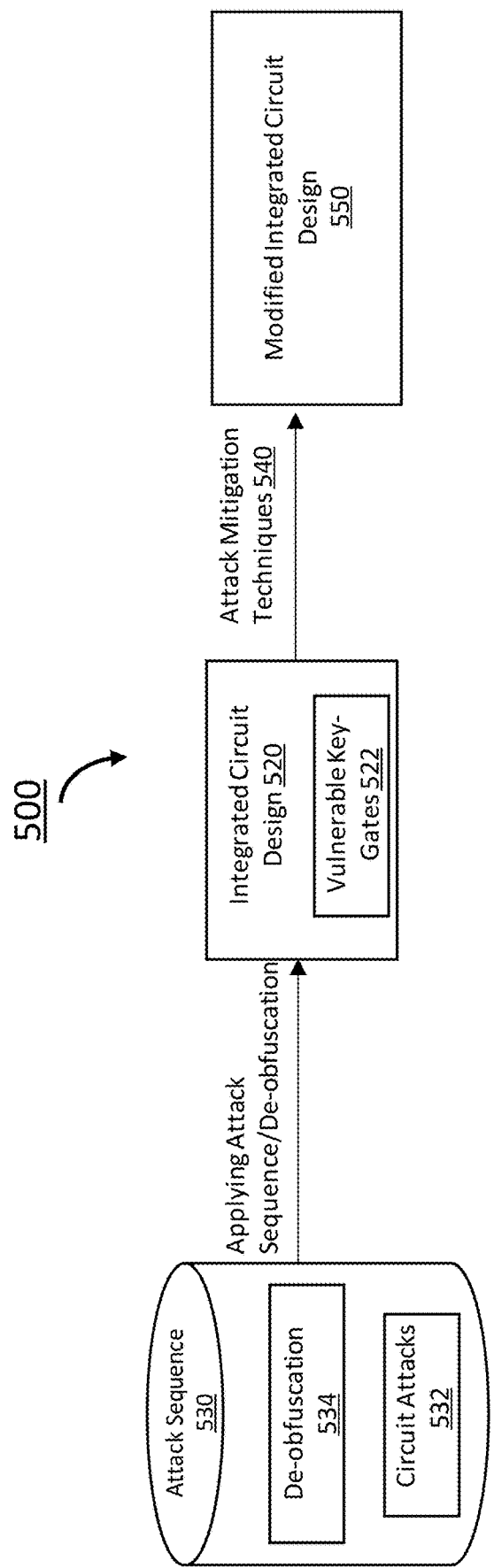
Figure 6:
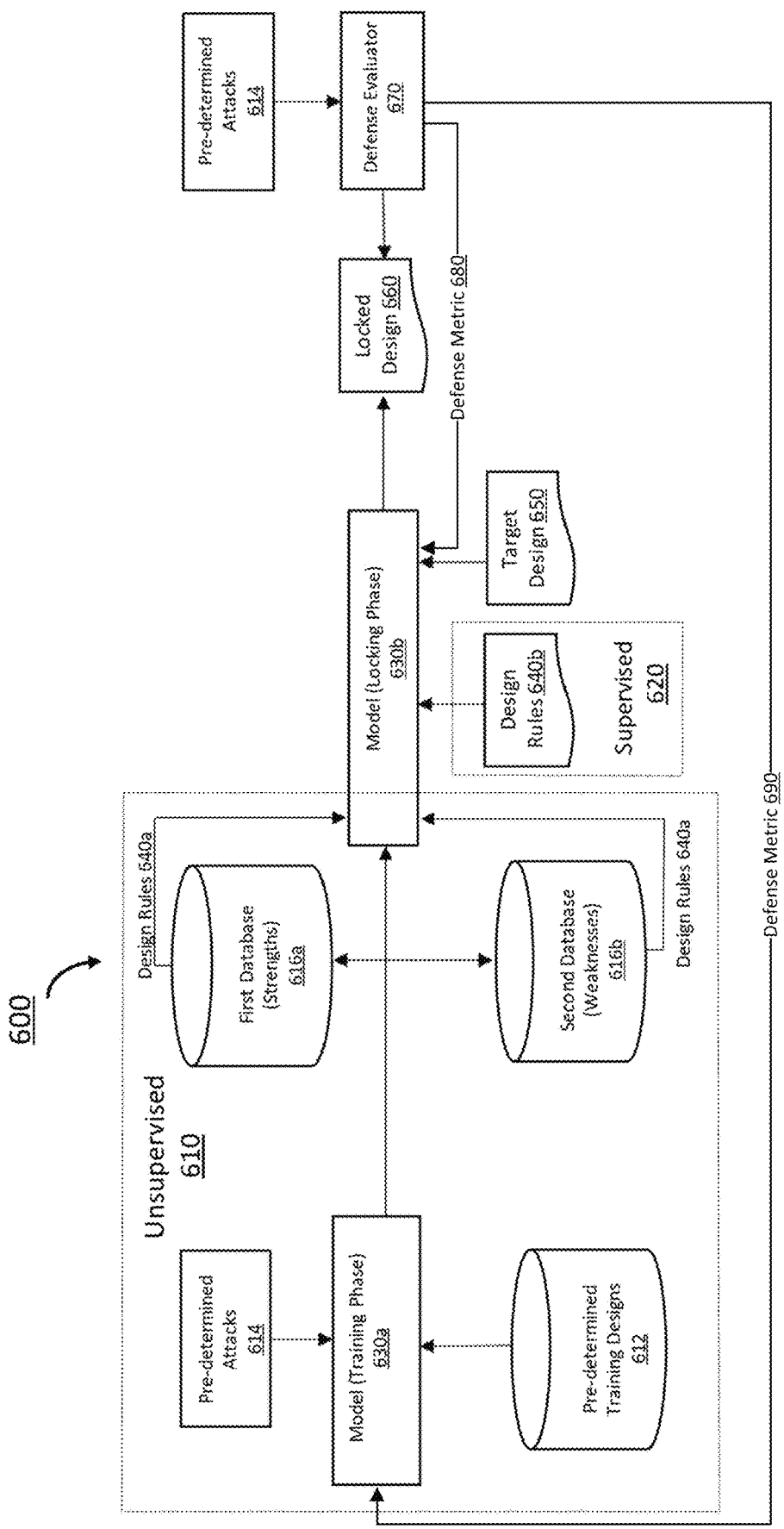
Figure 7A:
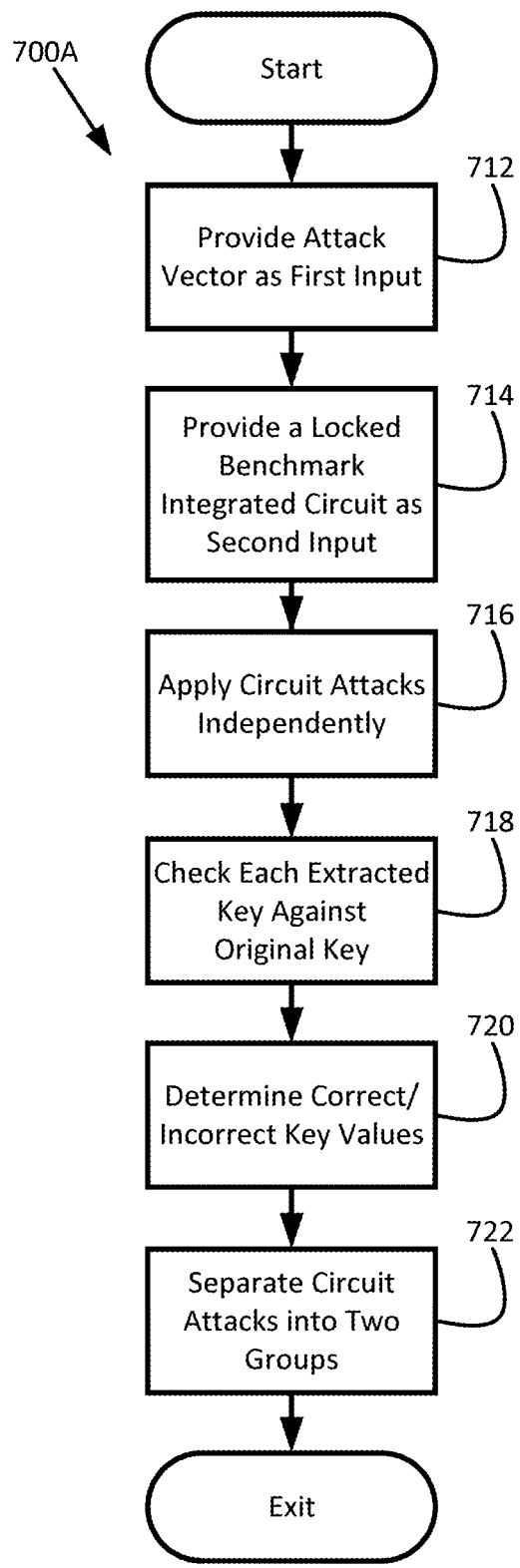
Figure 7B:
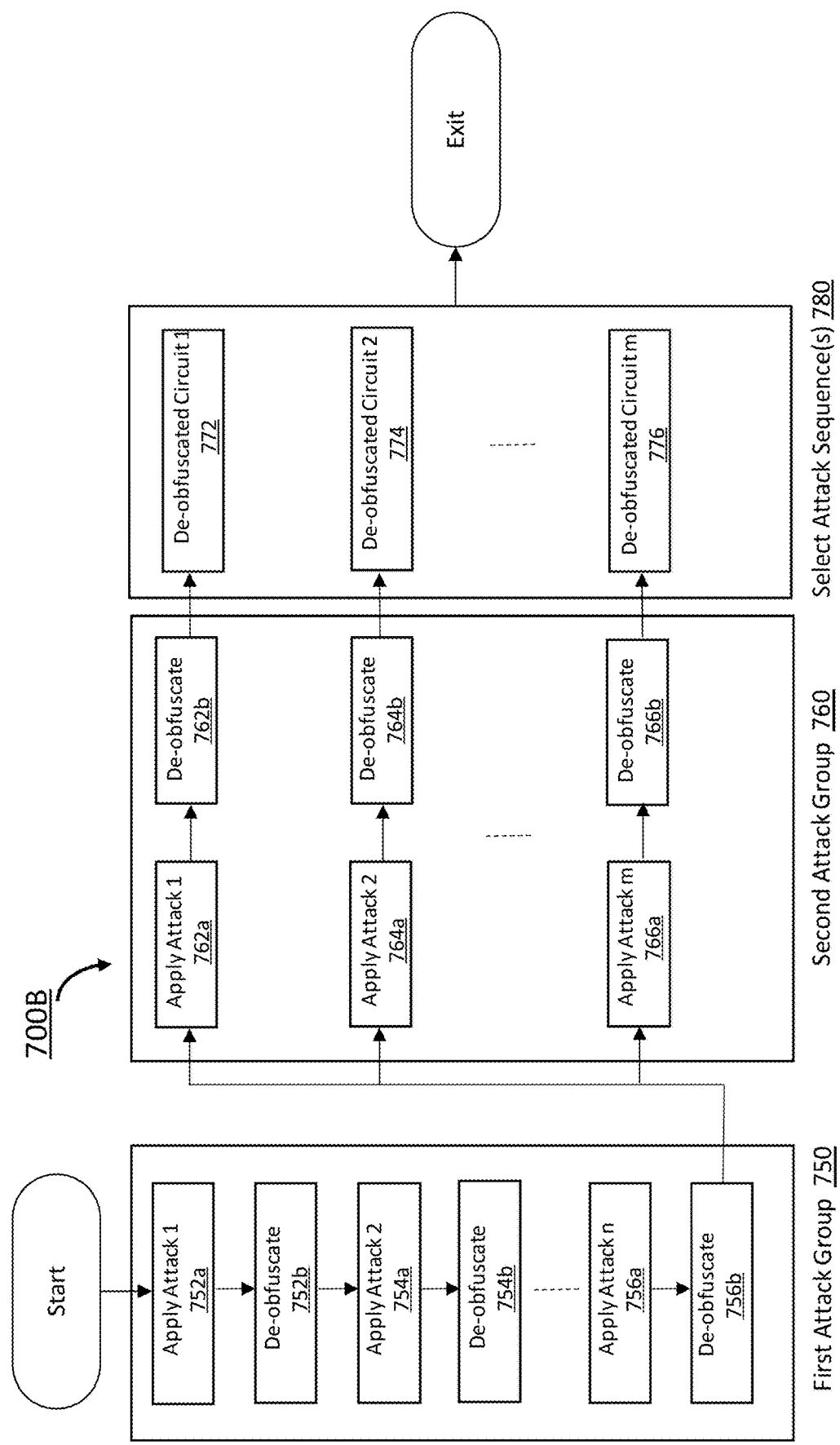
Figure 8:
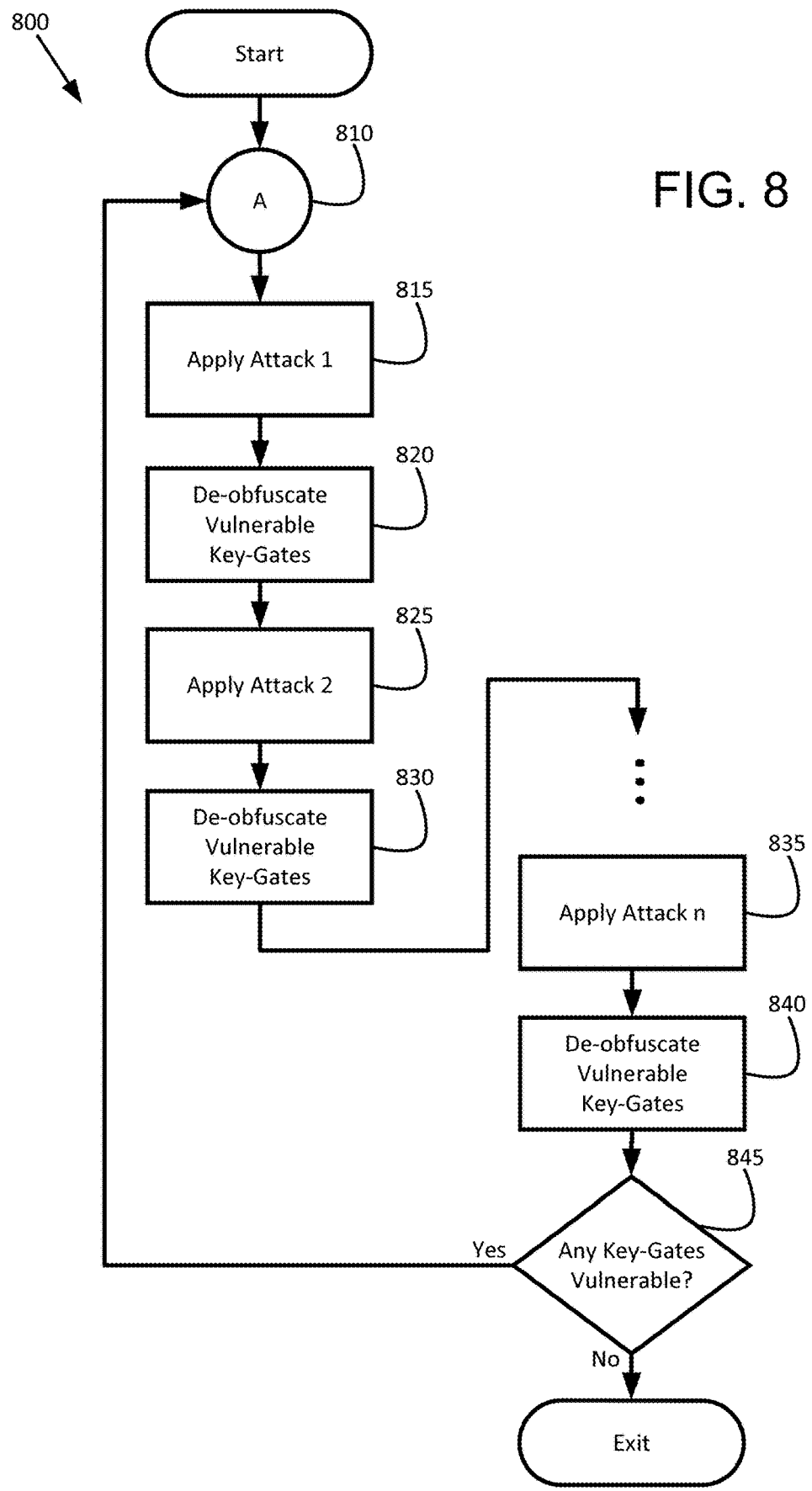
Figure 9:
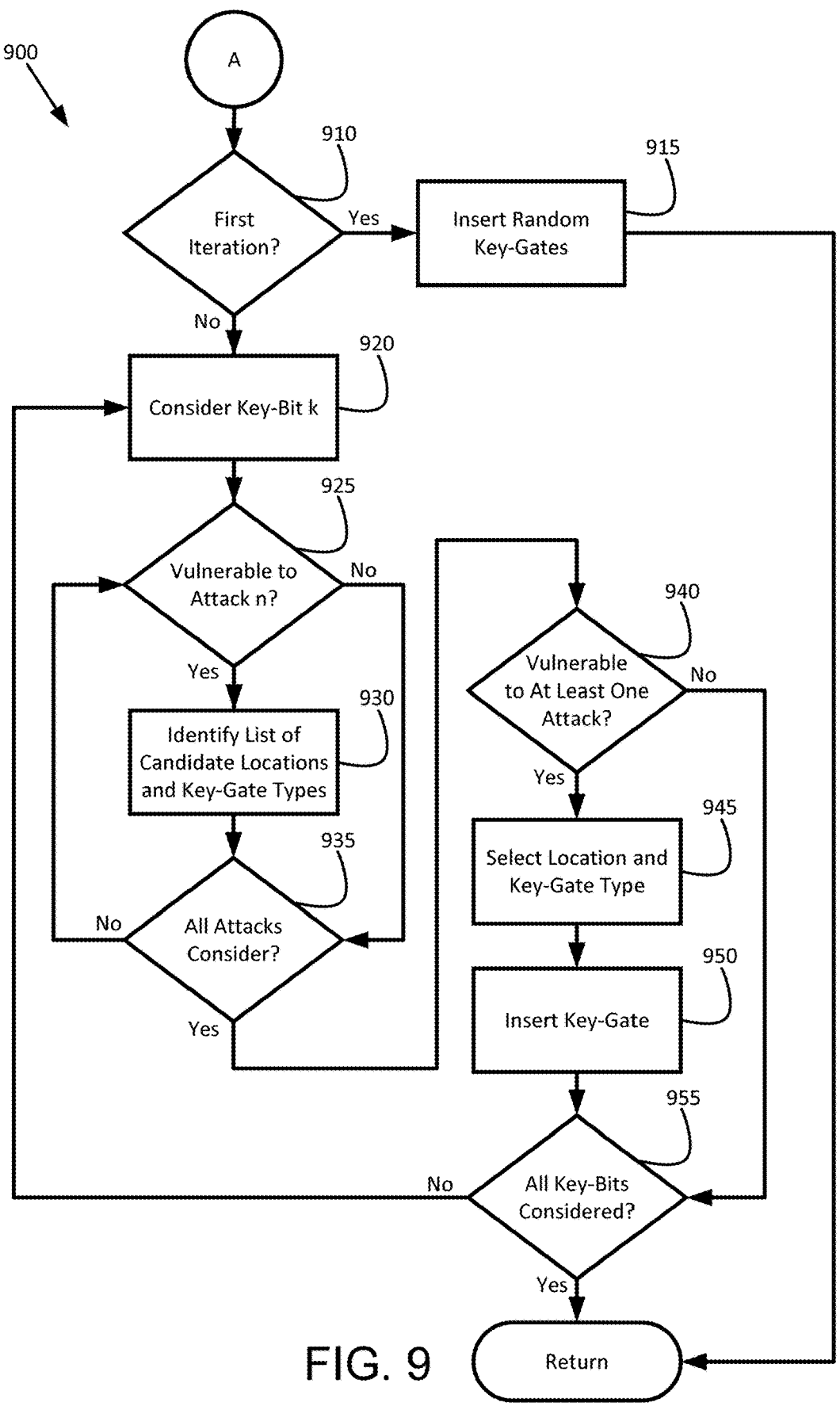
Figure 10:
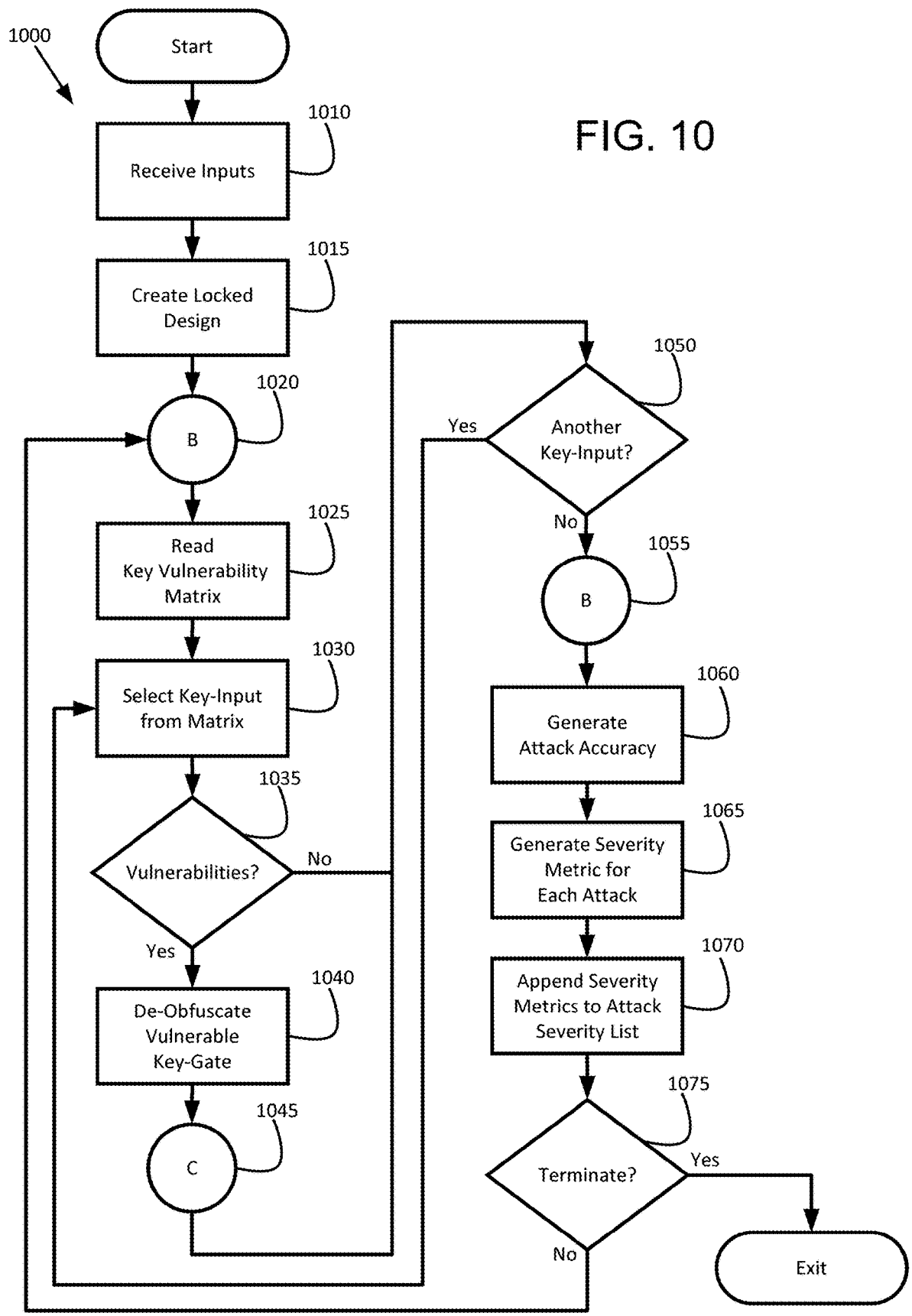
Figure 11:
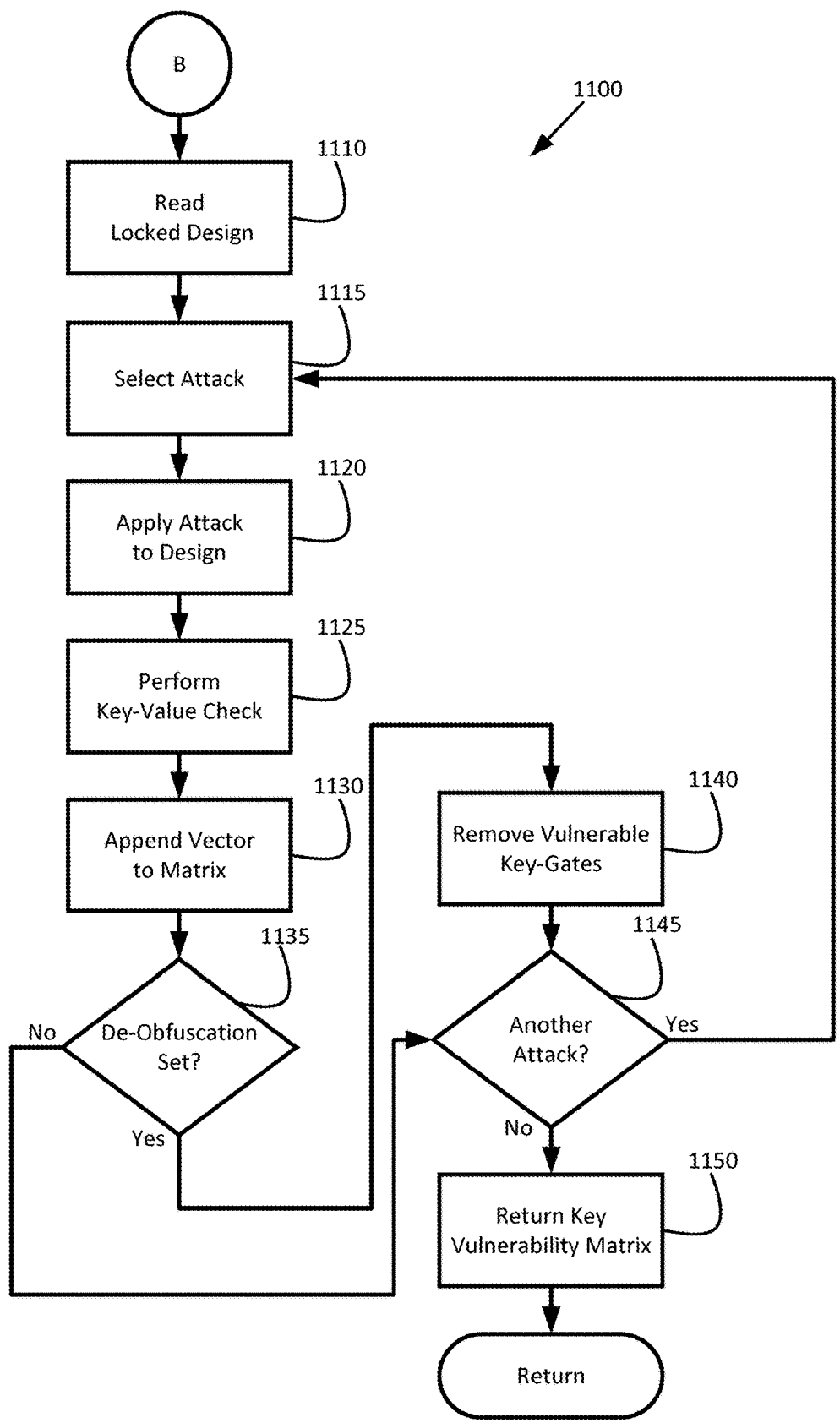
Figure 12:
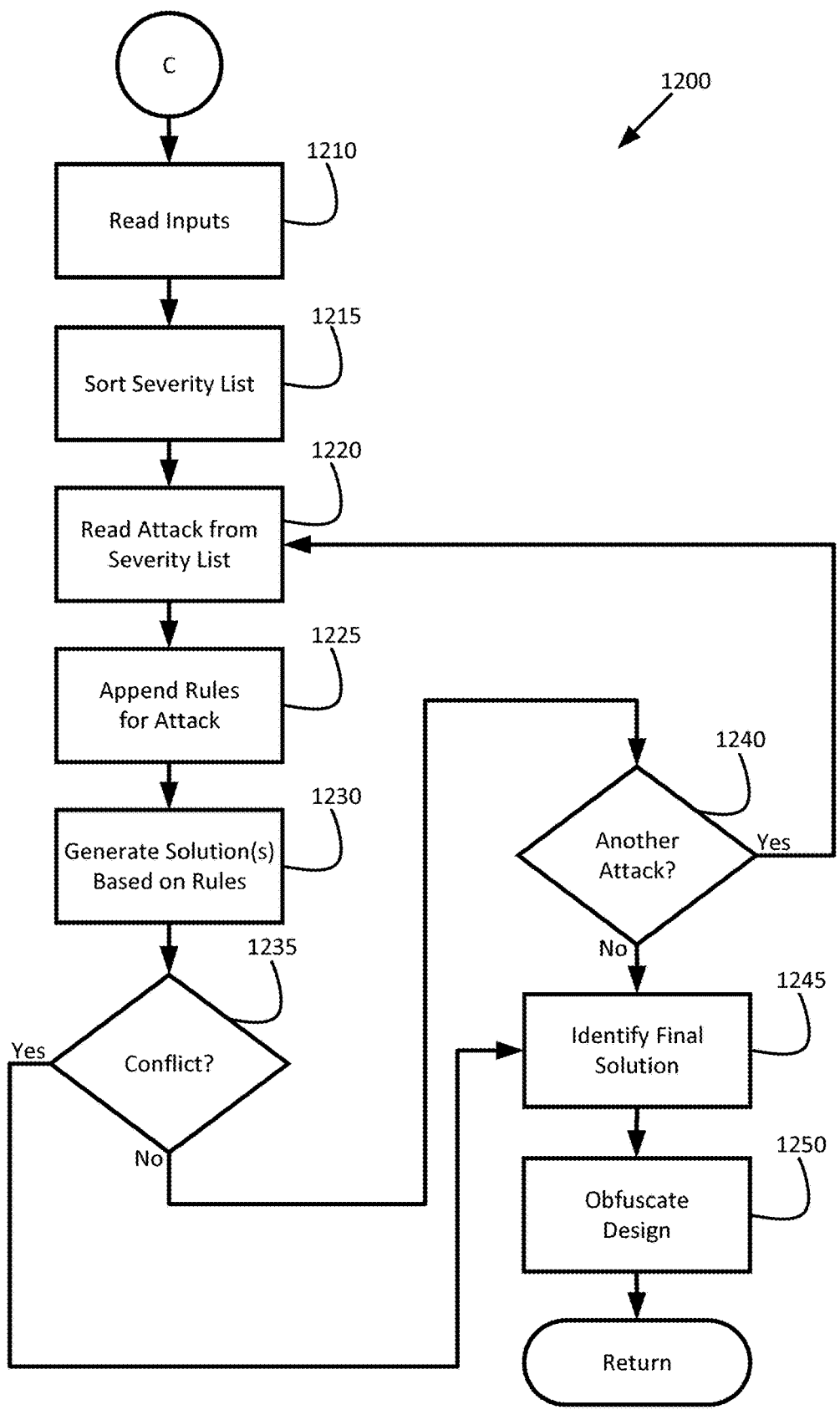
Figure 14:
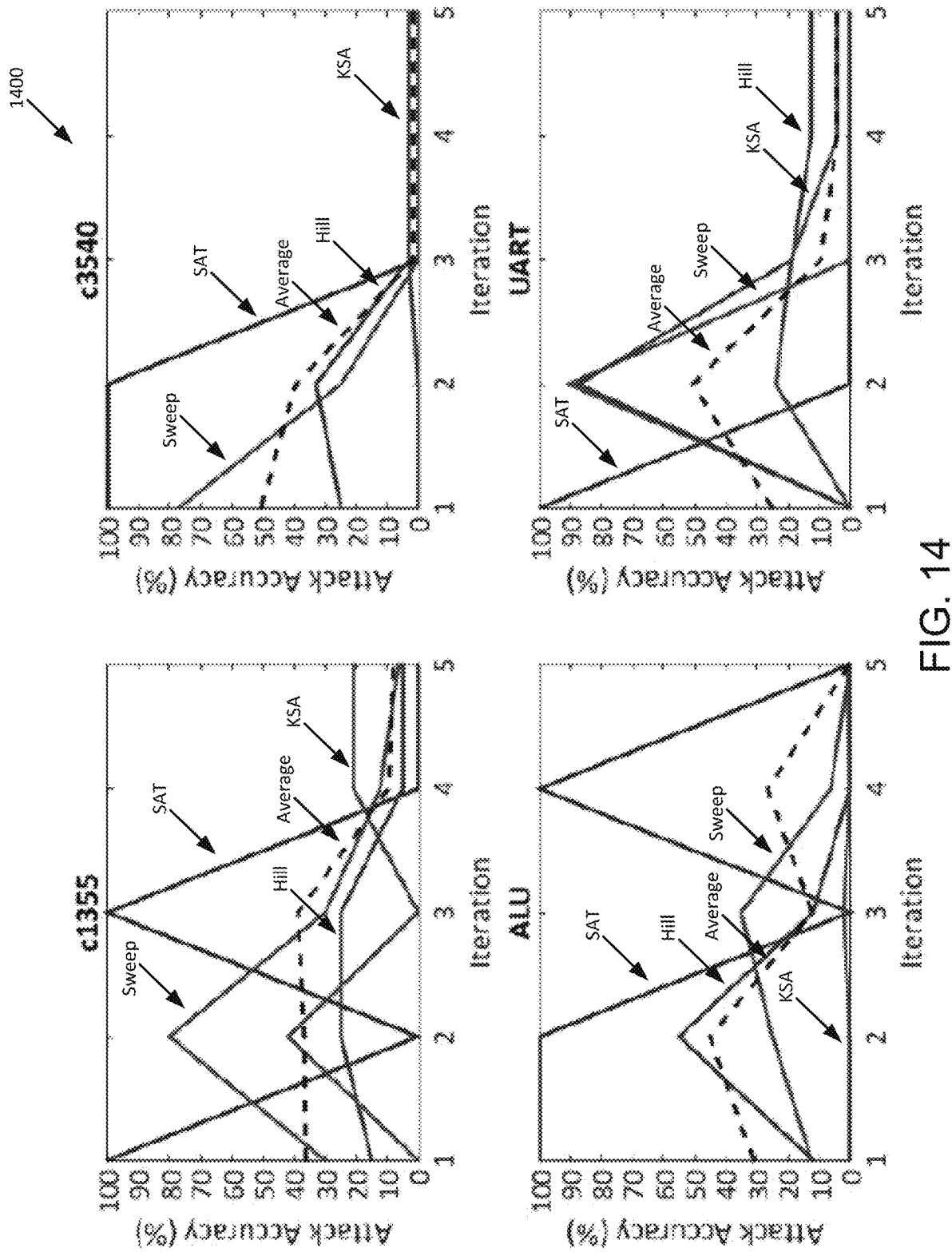
Figure 16:
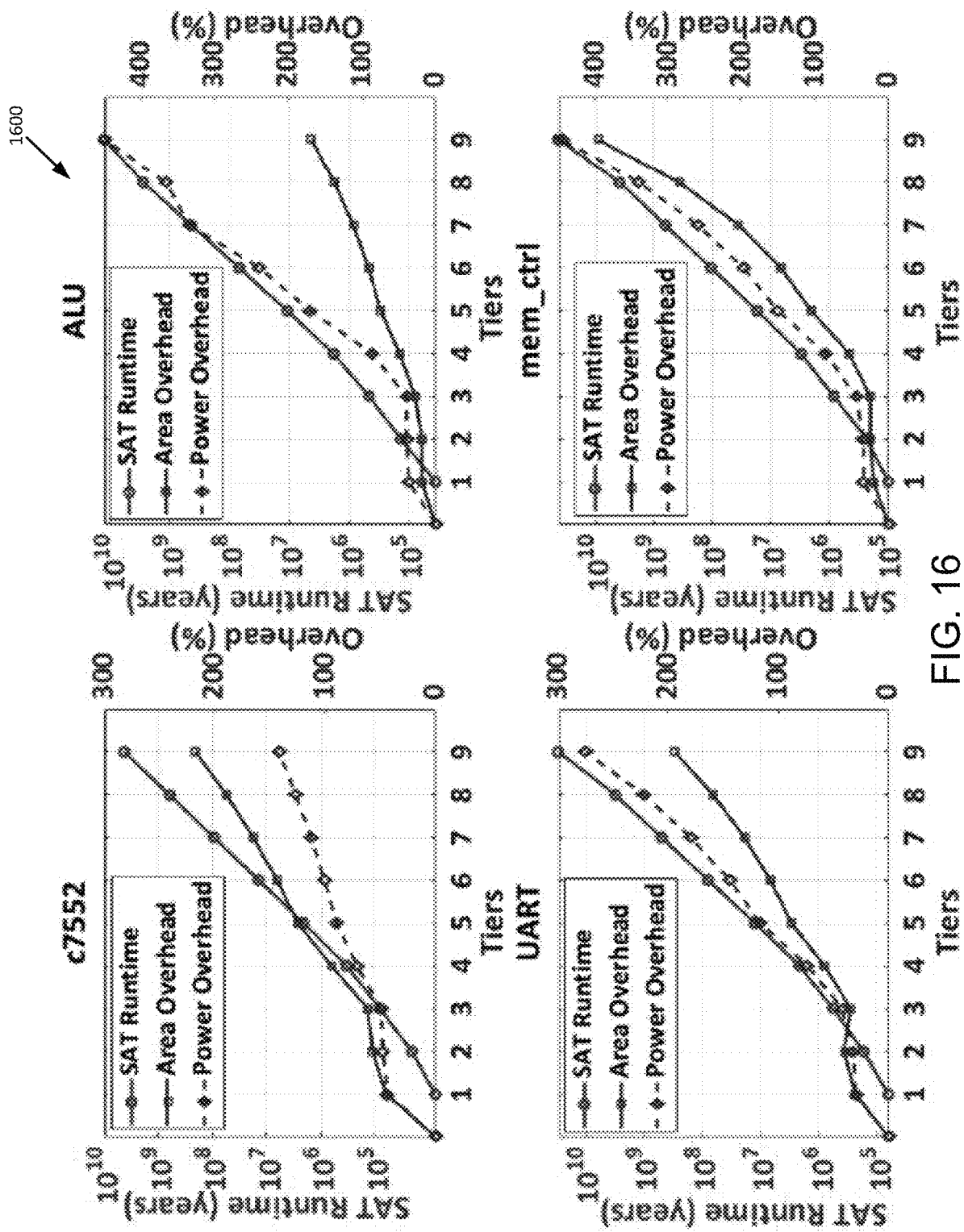

FIGS. 2A-D provide examples of types of locking processes;

FIG. 3 is a diagram of a system architecture that may be used in conjunction with various embodiments of the present disclosure;

FIG. 4 is a schematic of a computing entity that may be used in conjunction with various embodiments of the present disclosure;

FIG. 5 is a diagram of a learning-guided obfuscation framework in accordance with various embodiments of the present disclosure;

FIG. 6 is a diagram of a learning-guided obfuscation framework demonstrating training of a knowledge-based rules selection model in accordance with various embodiments of the present disclosure;

FIGS. 7A and 7B provide a process flow for generating an attack sequence in accordance with various embodiments of the present disclosure;

FIG. 8 provides a process flow for evaluating a locked target integrated circuit design in accordance with various embodiments of the present disclosure;

FIG. 9 provides a process flow for locking a target integrated circuit design in accordance with various embodiments of the present disclosure;

FIG. 10 provides a process flow for evaluating and locking a target integrated circuit design in accordance with various embodiments of the present disclosure;

FIG. 11 provides another process flow for evaluating a locked target integrated circuit design in accordance with various embodiments of the present disclosure;

FIG. 12 provides another process flow for locking a target integrated circuit design in accordance with various embodiments of the present disclosure;

FIG. 13 displays a table of accuracy results for various attacks;

FIG. 14 displays charts showing attack accuracy of various benchmarks across iterations performed in accordance with various embodiments of the present disclosure;

FIG. 15 displays a table of area, power, delay overheads and SAT attack complexity results; and FIG. 16 displays charts showing SAT-resiliency and performance results.

DETAILED DESCRIPTION OF VARIOUS EMBODIMENTS

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The following brief definition of terms shall apply throughout the application.

The term "comprising" means including but not limited to, and should be interpreted in the manner it is typically used in the patent context. The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment). If the specification describes something as "exemplary" or an "example," it should be understood that refers to a non-exclusive example; The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

General Overview of Various Embodiments

Hardware obfuscation can be categorized into two broad classes, physical obfuscation and logic locking. Physical obfuscation is a technique that tries to hide the design intent by performing modifications to the design. This approach can be performed by adding dummy contacts and vias to the layout representation of the IP that makes the circuit structure unrecognizable. The approach protects the IP from reverse-engineering attempts, typically at post-silicon stages. On the other hand, logic locking is a technique that locks the functionality of the IP through design-time modification. This approach is usually applied to the RTL or the gate-level netlist. The approach locks the IP's functionality by adding a key-based locking mechanism, which corrupts the output of the IP when an incorrect key is applied. Logic locking processes are also broadly categorized as sequential or combinational. A sequential locking process requires the user to apply a sequence of key-bits for several clock cycles through designated input ports to unlock the locked design. Conversely, all key-bits in combinational locking processes are applied simultaneously through a designated key-input port for each bit. An overview 100 of the hardware IP life span and some possible threats is shown in FIG. 1. As discussed further herein, various embodiments of the disclosure focus on combinational logic locking since most existing attacks are applicable to this category.

Various embodiments of the disclosure provide a learning-guided obfuscation framework for hardware IP protection that can iteratively harden a design against a set of attacks. Various embodiments of the framework initially perform a simple key-based locking on a given IP. The framework then employs a feedback-based iterative process that performs a robust hardware obfuscation to the target IP. During this iterative process, the framework considers a set of attacks to defend against and a set of corresponding countermeasures that could be integrated to eliminate the vulnerability against those attacks. At each iteration, a thorough security assessment is performed in some embodiments to determine the level of vulnerabilities for all attacks. A database of attack mitigation rules is then used in particular embodiments, built through a prior knowledge on what design transformation can protect against a specific attack, to address these vulnerabilities. In addition, a knowledge-based rules selection model is used in particular embodiments to identify the appropriate rules to be applied for each key-bit in order to eliminate the detected vulnerabilities. Accordingly, this iterative process of obfuscation and security assessment may be continued in various embodiments until process termination criteria are met. Further, various embodiments of the framework are flexible to easily account for emerging attacks. Furthermore, various embodiments are compatible with both Application Specific Integrated Circuit (ASIC) and Field Programmable Gate Array (FPGA) design flows.

Various embodiments of the disclosure provide the following technical contributions. Specifically, various embodiments provide a framework that performs robust obfuscation to hardware IPs and can be used to incorporate many of the existing logic locking techniques that harden them with respect to many possible attacks. Embodiments also provide the capability to account for future locking processes. In addition, various embodiments of the framework employ a novel approach to eliminate detected vulnerabilities on logic locking by utilizing a comprehensive set of attack mitigation rules that can be used to thwart the considered attacks. In some embodiments, these rules are described using a novel grammar that the framework is able to interpret and execute. Further, various embodiments implement a complete obfuscation process and a tool for the proposed obfuscation. Furthermore, some embodiments incorporate a knowledge-based rules selection model that finds an optimized attack mitigation solution. In these embodiments, the model may evaluate candidate locking techniques and significantly reduce conflicts in the implemented rules. Finally, various embodiments of the framework integrate a security evaluation process that applies attacks and security evaluation tools to the obfuscated design that can be updated with new attacks and exploits.

Types of Locking Mechanisms

A wide range of locking processes have been used. Some of the types of locking processes are now described.

Logic Inverting Mechanisms

XOR/XNOR gates can be used as locking key-gates. A key signal is considered one of the inputs to the gate, and the other input is for the net that needs to be locked. A key value of "0" is used for an XOR, while a key value of "1" is used for XNOR. FIG. 2A provides an example 200 of a simple circuit. Accordingly, FIG. 2B provides the example 200 with an inserted key-gate of an inverting manner 210.

Rerouting Mechanisms

Multiplexers and switch-boxes can be inserted at the end of the selected net, where one of the inputs to the multiplexer is the original fan-in cone, while the other is a dummy route. This dummy route can be set to a constant, a primary input, a net from another fan-in cone in the design, or a newly added dummy function. The select signal of the multiplexer is considered the key, where the correct value points at the original fan-in cone of the circuit. FIG. 2C shows the example 200 with an inserted MUX key-gate 215, where the listed dummy input options are outlined. Examples of newly inserted dummy functions may include Binary Decision Diagram (BDD) obfuscation, where the incorrect key-input leads to an altered BDD.

Moreover, a routing based technique that can be used is Cross-Lock, where a key-based layout-level cross-bar is used to reroute a set of wires according to the applied key value. A similar concept referred to as full-lock has been applied to gate-level netlists using Look-Up Tables (LUTs), where an array of rerouting LUTs are placed after a set of nets. This array permutes the outputs of the selected wires unless the correct key is applied. A cyclic locking technique has been introduced where MUX key-gates are utilized to form combinational loops when the key is incorrect. A delay-based locking mechanism has also been introduced where the incorrect key reroutes the data transition to a slower path, which in turns can cause performance hits, or incorrect functional behavior.

Functional-Stripping Operations

A reversible functional-stripping operation can be inserted at the end of the selected net (or multiple nets), where the output of the function is a corrupted version of the original output of the selected nets. A key-controlled function-restoring unit can be added as well, where the correct key value performs the inverse of the initial functional-stripping operation. The output of the restoring unit is valid if the applied key value is correct. The Stripped-Functionality Logic Locking (SFLL) process is an example of this locking type. FIG. 2D shows an overview of functional-stripping operation and restoring units 220.

Obfuscation of Systems with Reconfigurable Fabrics

Reconfigurable fabrics in many systems can be leveraged to perform a strong locking mechanism to parts of the re-configurable fabric that are not completely utilized. For instance, the locking technique has been introduced that takes advantage of the unused pins and configurable memory cells (dark silicon) of LUTs to insert key-controlled dummy functions. An enhancement to LUT based obfuscation called LUT-Lock has been introduced where multiple key-features are considered to control corruptibility, and reduce the number of correct keys. Another approach that imposes reconfigurable logic barriers has been introduced. These key-controlled barriers corrupt the flow of data nets when the key is applied incorrectly.

Net Selection Techniques

The selection of nets is generally an important part of the locking process. Accordingly, a number of net selection processes for obfuscation has been introduced due to the wide range of IP types and sizes, some of which are now described.

Random Insertion (RN)

The first logic locking technique ever introduced is called Ending Piracy in Integrated Circuits (EPIC). The process of selecting nets to be obfuscated is totally random, where key-gates are inserted without any prior analysis to the circuit. This technique has inspired a wide range of approaches that aim to improve on the provided level of protection that EPIC offers.

Secure Logic Locking (SLL)

Another selection technique is called Secure Logic Locking (SLL), where a set of heuristics are implemented to reduce the key-gate masking issue. Masking is defined as the instance where a key-gate mutes the effect of another key-gate, which reduces the effect of the obfuscation and introduces new vulnerabilities. The selection process in SLL is designed to avoid any adjacent net selections, where masking might occur.

Logic Cone Size (CS)

The logic cone size technique looks for nets with large fan-in and fan-out logic cones in the circuit. This selection process focuses on maximizing the amount of corruption caused by the key-gates when the applied key value is incorrect. The process evaluates each node in the circuit and ranks them based at least in part on the number of nodes that exist in both the fan-in and fan-out cones. Nets with the highest values are chosen for obfuscation.

Controllability and Observability Based Insertion

This selection process analyzes each net for the switching activity based at least in part on input patterns (controllability), or the probability of affecting the observed output (observability). Based at least in part on these analysis, techniques may target low controllability nets in order to prevent Trojan insertions. Other techniques may focus on selecting nets with specific observability values to control the level of corruption in order to allow for error tolerance when unreliable keys are used.

Attacks on Obfuscation

Existing attacks that are relevant to logic locking are now discussed in detail. It is worth noting that some of these attacks provide full keys, while others provide partial keys. Different levels of attack confidence are observed for different types. A summary of these attacks is shown in Table 1.

TABLE 1

A Summary of Attaches on Obfuscated Gate-Level Netlists

| Attack | Type | Unlocked Design | Locking Algorithm |
|---|---|---|---|
| SAT-Based Attacks* | Functional | Required | Not Required |
| Removal/Bypass | Structural | Required | Not Required |
| KSA | Functional | Required | Not Required |
| Hill-Climbing | Functional | Required | Not Required |
| SWEEP | Structural | Not Required | Required |
| SAIL | Structural | Not Required | Required |

*SAT/SMT solvers cannot break designs with complex arithmetic operations

Boolean Satisfiability Attack (SAT)

The Boolean Satisfiability Attack (SAT) has been proven to be one of the most impactful attacks up to date. The attack requires the locked netlist as well as an unlocked device that provides correct outputs for any applied input patterns (oracles). The process of the attack employs a satisfiability algorithm to find distinguishing input patterns (DIPs). These DIPs are input patterns that cause the locked and unlocked circuits to provide different outputs. Upon finding a DIP, a subset (class) of key values associated with that input pattern and its relative BDD branch is eliminated. This process is iterated until the entire BDD tree for the circuit is covered, and no DIPs are found. Due to the extensive use of SAT algorithms in the attack process, the attack is not able to break circuits that contain SAT-hard functions (such as multipliers) as they are inherently complex for the algorithm. Since the attack was introduced, several countermeasures have been proposed to mitigate it. For example, SARLock, Anti-SAT, and TTLock have been proposed to increase the processing time for SATs, the goal in these countermeasures is to drastically reduce the number of eliminated keys per iteration, which forces the SAT algorithm to almost brute-force the key. However, these approaches have been vulnerable to multiple attacks, such as removal, bypass, and AppSAT attacks.

In particular, AppSAT attacks exploits locking techniques that do not cause large output corruptibility when incorrect keys are applied. The attack provides "approximate keys" that can provide mostly correct functionality. A cyclic-focused SAT called CycSAT has been introduced which supports the unlocking process of designs containing combinational loops. Moreover, a modified version of the SAT called Double-DIP has been introduced. The attack looks for two DIPs in any given iteration, which can be enough to find a fully functioning key in low corrupting SAT-resistant functions such as SARLock. Another enhancement to the original SAT has been introduced which integrates Satisfiability Modulo Theories (SMT) solvers instead of SAT ones. These solvers have shown to perform faster in finding DIPs and breaking the obfuscation.

Key Sensitization Attack (KSA)

Key Sensitization Attacks (KSA) aim to leak the correct value of a key-input to a primary output. The attack is performed by looking for input patterns that cause the key value to propagate to an output port. Similar to SAT, the attack requires both a locked gate-level netlist and an unlocked chip. The major limitation of this attack is that finding an input pattern that can sensitize the key may not always be possible as the attack relies on coincidental insertion that happens to have masking gates. The mentioned SLL process mitigates this attack by avoiding adding key-gates in a cascaded or mutable fashion.

Functional Hill-Climbing Attacks

A hill-climbing attack treats the locked circuit as an optimization problem and the key-inputs as the parameters. The attack requires a set of valid input-output patterns (oracles) or an unlocked system to use for comparison. The initial applied key value is randomly selected. The iterative processes performed in this attack employs a set of input patterns and compares the output of both the locked and unlocked circuits. The attack algorithm then evaluates the rate of valid outputs over the overall set of patterns (correctness rate). After the correctness rate is obtained, the applied key is slightly modified, and the rate is checked again. If it increases, the change in the key is kept. Otherwise, the key is reverted to the previous value. It is also observed that the use of Automatic Test Pattern Generation (ATPG) generated test patterns as the input pattern set can improve the accuracy of the attack. A significant limitation of this attack is when the key size is large, which increases the complexity of the optimizing process, given that the locking method provides high output corruptibility.

Attacks on SFLL

The functional analysis attack on logic locking (FALL) is an attack specifically made to break the Hamming distance version of SFLL (SFLL-HD). The attack algorithm performs structural and functional analysis to identify the stripping units and restore the original functionality. In addition to FALL, two algorithms have been introduced that are able to break SFLL-HD through identifying the protected patterns.

Constant Propagation Attack (SWEEP)

SWEEP is an oracle-less structural-analysis based attack, where the effect of performance and physical attributes of the circuit is exploited to extract the key. The attack does not require an unlocked circuit, but the locking algorithm used to generate the obfuscated netlist is needed. SWEEP uses the locking algorithm to generate training data with known key values, then performs constant propagation analysis on individual key-inputs to establish a correlation between the correct key values and the change in physical and functional properties of the circuit.

Structural Analysis Using Machine Learning (SAIL)

SAIL is a machine learning structural analysis attack on combinational logic locking. The attack aims to restore the locked netlist to its pre-synthesis state, where the inserted key-gates are observable. The attack requires the locking algorithm, and it performs a self-referencing approach to evaluate the obfuscation technique and train its classifiers. Self-referencing is the process of applying another round of obfuscation to the already locked circuit. Using self-referenced circuits as training sets provides a significant benefit since using the same IP refines the accuracy and further exposes the added key-gates. SAIL is limited to XOR/XNOR key-gates, which compliments the SWEEP attack. A new version of this attack called Joint Structural-Functional Attack on Logic Locking (SURF) has been developed, where the original attack algorithm is followed by a hill-climbing attack to improve the accuracy.

Threat Model

Adversaries can be viewed as parties that may benefit from obtaining an unlocked soft IP, such as rogue employees, competitors, and even states. A common goal for adversaries is to obtain enough knowledge about the IP to generate counterfeits. Other goals for these attackers include the insertion of back-doors or hardware Trojans, where an adversary may be able to have unauthorized access or control over the IP. These attacks can be performed in an untrusted facility, or after deployment of the system by a customer. Threats in different stages of the life cycle of the IP are outlined in FIG. 1. Accordingly, various embodiments of the disclosure have been developed following Kerckhoffs's principle, which assumes the worst-case scenario. In the threat model, the attacker has access to an unlocked fabricated IC system, which can be used to generate input-output pairs (oracles). Additionally, the attacker has obtained a copy of the locked gate-level netlist, with the key-input ports correctly identified.

The various logic locking techniques have their strengths and weaknesses. For instance, many techniques are straightforward, in which they blindly insert key-gates based at least in part on a singular-goal heuristic. Moreover, the type of target circuit to be obfuscated can contribute to those strengths or weaknesses. Therefore, relying on a static feed-forward obfuscation approach can prove to be inefficient and, in many cases, insecure. Additionally, many strong attacks on logic locking have emerged. These attacks expose various locking processes to new and unexplored vulnerabilities. Whereas, newly introduced countermeasures are developed to mitigate these attacks, which resulted in a "cat-and-mouse" behavior. Hence, a lack of a framework exists in the industry that systematically performs both locking techniques and attacks, with the ability to update the framework with new locking processes and attacks whenever they become available.

Definitions of Certain Terms

The term "attack mitigation rules" may refer to a set of conditions and constraints that are used to determine the location of key-gates in gate-level netlists along with their respective gate types to mitigate different attacks.

The term "knowledge" may refer to for each obfuscation key-bit, the attacks which are able to recover the correct key value and can be learned in current and previous iterations of various embodiments of the framework described herein.

The term "rules conflict" may refer to a conflict that occurs when two attack mitigation rules cannot be applied (e.g., if a rule requires a key-gate type to be XOR, while a second rule requires the key-gate type to be a MUX).

Computer Program Products, Systems, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., generated or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 3 illustrates a system architecture 300 that may be used in accordance with the various technologies and concepts disclosed herein. The system architecture 300 includes one or more server(s) 310 and one or more data storage media 320 in communication over a network 315. Depending on the embodiment, the network 315 may include one or more of a cellular network, Internet, intranet, Local Area Network, Wide Area Network, or any other form of connecting two or more systems, components, or storage devices together. In particular embodiments, the one or more server(s) 310 may be act in the capacity of an expert system as described further herein. In addition, the architecture 300 may include any combination and number of servers 310 and data storage media 320 in any standard, distributed, or clustered configuration. For example, the data storage media 320 may include one or more devices such as hard disks arranged in a Redundant Array of Independent Disks (RAID) array, a tape storage drive including a magnetic tape data storage device, an optical storage device, and/or the like.

Exemplary Computing Entity

FIG. 4 provides a schematic of a computing entity 400 according to various embodiments of the present invention. For instance, the computing entity 400 may be a server 310 found within the system architecture 300 previously described in FIG. 3. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 400 shown in FIG. 4 may be embodied as a plurality of computing entities, tools, and/or the like operating collectively to perform one or more processes, methods, and/or steps. As just one non-limiting example, the computing entity 400 may comprise a plurality of individual data tools, each of which may perform specified tasks and/or processes.

Depending on the embodiment, the computing entity 400 may include one or more network and/or communications interfaces 425 for communicating with various computing entities, such as by communicating data, content, information, and/or similar terms used herein interchangeably that can be transmitted, received, operated on, processed, displayed, stored, and/or the like. Thus, in certain embodiments, the computing entity 400 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 400 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 400 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 400 includes or is in communication with one or more processing elements 410 (also referred to as processors, processing circuitry, and/or similar terms used herein interchangeably) that communicate with other elements within the computing entity 400 via a bus 430, for example, or network connection. As will be understood, the processing element 410 may be embodied in several different ways. For example, the processing element 410 may be embodied as one or more complex programmable logic devices (CPLDs), microprocessors, multi-core processors, coprocessing entities, application-specific instruction-set processors (ASIPs), and/or controllers. Further, the processing element 410 may be embodied as one or more other processing devices or circuitry. The term circuitry may refer to an entirely hardware embodiment or a combination of hardware and computer program products. Thus, the processing element 410 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 410 may be configured for a particular use or configured to execute instructions stored in volatile or non-volatile media or otherwise accessible to the processing element 410. As such, whether configured by hardware, computer program products, or a combination thereof, the processing element 410 may be capable of performing steps or operations according to embodiments of the present invention when configured accordingly.

In various embodiments, the computing entity 400 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 420 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 420 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 420 may also be embodied as a data storage device or devices, as a separate database server or servers, or as a combination of data storage devices and separate database servers. Further, in some embodiments, the memory media 420 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein use data storage in which some or all the information/data required for various embodiments of the invention may be stored.

In various embodiments, the computing entity 400 may further include or be in communication with volatile media (also referred to as volatile storage, memory, memory storage, memory circuitry and/or similar terms used herein interchangeably). For instance, the volatile storage or memory may also include one or more volatile storage or memory media 415 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 415 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 410. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 400 with the assistance of the processing element 410 and operating system.

Although not shown, the computing entity 400 may include or be in communication with one or more input elements, such as a keyboard input, a mouse input, a touch screen/display input, motion input, movement input, audio input, pointing device input, joystick input, keypad input, and/or the like. The computing entity 400 may also include or be in communication with one or more output elements (not shown), such as audio output, video output, screen/display/interface output, motion output, movement output, and/or the like.

As will be appreciated, one or more of the computing entity's components may be located remotely from other computing entity components, such as in a distributed system. Furthermore, one or more of the components may be aggregated and additional components performing functions described herein may be included in the computing entity 400. Thus, the computing entity 400 can be adapted to accommodate a variety of needs and circumstances.

Overview of Learning-Guided Obfuscation Framework

Various embodiments of the disclosure involve a learning-guided approach that learns the strengths and weaknesses of each inserted key-gate. Accordingly, in various embodiments, the iterative process described herein gradually improves the security of the obfuscated hardware IP design (e.g., circuit) as the process detects vulnerabilities of the locked circuit and suggests the best locations and key-gate types to be inserted. In particular embodiments, the framework includes two databases, the first of which is the attack mitigation rules database $\mathbb{R}_{Database} = \{\mathbb{R}_1, \mathbb{R}_2, \mathbb{R}_3, \ldots, \mathbb{R}_m\}$. The rules stored in this database are used to guide the selection process of locations and key-gate types to ensure resiliency against the considered attacks. The second database is an attacks and security evaluation tools database $\mathbb{A}_{Database} = \{\mathbb{A}_1, \mathbb{A}_2, \mathbb{A}_3, \ldots, \mathbb{A}_m\}$. The attacks and security evaluation tools stored in the database are used to assess the security of the target circuit and report any detected security flaws. In various embodiments, the appropriate attack mitigation rules are retrieved (e.g., queried) from the attack mitigation rules database based at least in part on the reported vulnerabilities. As discussed herein, such rules may be retrieved by a knowledge-based rules selection model utilized by an expert system. In some embodiments, the knowledge-based rules selection model may be configured as a machine-learning model. Accordingly, in various embodiments, a set of candidate nets and locking mechanisms (e.g., key-gate types) for each key may be generated and following the analysis of the provided rules, the expert system may perform a locking of the target IP (e.g., circuit).

Referring to FIG. 5, a diagram of an exemplary learning-guided obfuscation framework 500 is depicted in accordance with various embodiments. Here, the learning-guided obfuscation framework 500 includes an integrated circuit design 520, an attack sequence 530, and a modified integrated circuit design 550. The integrated circuit design 520 includes one or more vulnerable key-gates 522. Accordingly, the attack sequence 530 includes a set of attacks 532 and a set of de-obfuscation 534 steps. The learning-guided obfuscation framework 500 applies the attack sequence 530 to the integrated circuit design 520 to identify the vulnerable key-gates 522. The learning-guided obfuscation framework 500 then applies a plurality of attack mitigation techniques 540 to the integrated circuit design 520, the result of which is the modified integrated circuit design 550.

Accordingly, in various embodiments, the learning-guided obfuscation framework 500 evaluates circuits locked by any combinational obfuscation process. Based at least in part on the type and severity of existing attacks, the learning-guided obfuscation framework 500 provides a set of attack schemes, e.g., the set of attacks 532, to ensure no vulnerabilities go undetected. In some embodiments, the learning-guided obfuscation framework 500 reports the severity of each attack, as well as a de-obfuscated version of the locked circuit, e.g., the integrated circuit design 520, with the vulnerable key-gates 522 removed.

The attack sequence 530 may be unique for each set of attacks and in some embodiments, where more than one attack sequence 530 is selected to be applied, the learning-guided obfuscation framework 500 may apply all generated sequences and report the highest attack accuracy. Accordingly, the learning-guided obfuscation framework 500 applies the attack sequence 530 to the integrated circuit design 520 to identify one or more vulnerable key-gates 522. The learning-guided obfuscation framework 500 then de-obfuscates the one or more vulnerable key-gates 522 via de-obfuscation 534. At this point, the learning-guided obfuscation framework 500 in various embodiments modifies the integrated circuit design 520 by applying one or more attack mitigation techniques 540 that may be selected based at least in part on the one or more vulnerable key-gates 522.

As previously noted, in some embodiments, the learning-guided obfuscation framework 500 may utilize attack mitigation rules that are a set of well-defined conditions and constraints that are used to determine the location of the key-gates in gate-level netlists along with their respective gate types to mitigate different attacks. In particular embodiments, these rules are written following a specific grammar that a knowledge-based rules selection model is able to capture and interpret. Specifically, in some embodiments, the learning-guided obfuscation framework 500 uses a systematic syntax grammar that the model can interpret into design-specific modifications and constraints.

A process of generating attack mitigation rules may be used in various embodiments when a new attack mitigation technique has been introduced. Specifically, the rules may be extracted by breaking down the mitigation technique into a set of specific instructions that are observable by the learning-guided obfuscation framework 500. In particular embodiments, rules may be formed for the newly introduced technique based at least in part on meeting a list of conditions that includes one or more of: (1) the attack algorithm being publicly available and can be reproduced and tested; (2) the design modification process for the new attack mitigation technique can be described in an algorithmic format; (3) the design modification process for the new attack mitigation technique is scalable and can be applied in polynomial time; and/or (4) the design modification process for the new attack mitigation technique applied to a gate-level netlist.

For example, the set of attack mitigation rules $\mathbb{R}_m$ for the design modification process of attack m may contain n rules. Considering the rule $R_m[n] \in \mathbb{R}_m$, there are two main categories of rules, rules that determine the type of inserted locking function $R_M^G[n]$, and rules that determine the location for insertion $R_M^L[n]$. Accordingly, rules can be described in particular embodiments using a novel grammar, where a set of conditions and operators are supported. Additionally, in some embodiments, each category of rules can support a set of special statements that can be used to specify detailed conditions. For instance, The following example shows the mitigation rules of attack m=2:

$$\text{EXAMPLE: } \mathbb{R}_2 = \begin{cases} R_2^G[0]: \text{KEYGATE } MUX \\ R_2^G[1]: DUMMYINP \text{ 2 RANDOM} \\ R_2^G[2]: \text{DUMMY\_FUN RANDOM} \\ R_2^L[3]: \sim FANIN \text{ 5 } OBFUS \end{cases}$$

In this example, the rule $R_2^G[0]$ specifies the type of the key-gate to be inserted. The key-gate type is chosen to be a MUX. The instruction in $R_2^G[1]$ specifies that the dummy input for the MUX is a randomly selected net that is two logic levels away from the selected insertion location. The rule $R_2^G[2]$ specifies that the inserted dummy function is randomly generated. And finally, the insertion location is outlined in $R_2^L[3]$ to be any random location as long as it is not within five logic levels of the fan-in cone of other inserted key-gates.

The set of attacks and vulnerability detection tools available in the attacks and security evaluation tools database ($\mathbb{A}_{Database}$) are used in performing a security assessment in various embodiments of the framework 500. Specifically, in particular embodiments, each attack is applied to the target design to generate a key value, such that $\mathbb{K}_m = \mathbb{A}_m(\text{design\_obf})$. Thus, in various embodiments, the database contains attacks and evaluation tools that expose vulnerabilities that can then be mitigated using the attack mitigation model for each attack to eliminate the exposed security flaws.

Rules-File Structure

As noted, the attack mitigation rules can be configured in particular embodiments using a novel grammar, where a set of conditions and operators are supported. The configuration of such rules are now discussed according to some embodiments. The rules-file starts with $START and ends with $END. Each rule is written in antecedent-consequent blocks, where each antecedent starts with $IF or $~IF and each consequent starts with $DO. A $~IF means that if the associated statement is false, that antecedent would be true. Each block ends with $ENDIF. In a block, all consequents come after antecedents as follows:

$IF<condition1>
$DO<statement1>
$DO<statement2>
$ENDIF

A compound antecedent joined by AND may be implemented by successively writing each simple antecedent in that block. For example, $IF <condition1> AND<condition2> may be implemented as:

$IF <condition1>
$IF <condition2>
. . .
$ENDIF

A compound antecedent joined by OR may be implemented by writing each simple antecedent in two separate blocks with the same set of consequents. For example, $IF <condition1> OR <condition2> may be implemented as:

$IF <condition1>
$DO<statement1>
. . .
$ENDIF
$IF <condition2>
$DO<statement1>
. . .
$ENDIF.

Conditions Syntax

The syntax for possible conditions for an antecedent accordingly to some embodiments are as follows:

NBR INP<[~](name/obfus)>—All nets which are input to the same gate as the net under consideration are called neighboring inputs. If the second argument is name and if a neighboring input has a name that starts with name, this statement is true. If name is preceded by ~, then the statement is true if a neighboring input does not have a name that starts with name. If the argument is obfus, then to make the statement true, a neighboring input has to be an obfuscated node (coming from a key-gate). If the argument is obfus and preceded by ~, then to make the statement true, there has to exist a neighboring input which is not an obfuscated node.

PARENT GATE <[~](name/x*r/buf/inv)>[depth]—A hierarchy of depth n indicates n gates in cascade with one of the final outputs as the net under consideration. If there exists a hierarchy of depth such that all the gates in the hierarchy have names that start with name, this statement is true. If name is preceded by ~, then the statement is true if there exists a hierarchy of depth such that none of the gates in that hierarchy have a name that starts with name. The default value of depth is 1. Wildcards for the second argument are x*r to denote either XOR or XNOR gates, buf to denote any buffer and inv to denote any inverter.

CHILD GATE <[~](name/x*r/buf/inv)>[depth]—A hierarchy of depth n indicates n gates in cascade with one of the initial inputs as the net under consideration. If there exists a hierarchy of depth such that all the gates in the hierarchy have names that start with name, this statement is true. If name is preceded by ~, then the statement is true if there exists a hierarchy of depth such that none of the gates in that hierarchy have a name that starts with name. The default value of depth is 1. Wildcards for the second argument are x*r to denote either XOR or XNOR gates, buf to denote any buffer and inv to denote any inverter.

FANIN<depth> <[~](name/obfus)>—It considers the fanin cone of the net under consideration up to a depth of depth. If the third argument is name and if any net in this cone has a name that starts with name, this statement is true. If name is preceded by ~, then the statement is true if there exists a net in this region that does not have a name that starts with name. If the third argument is obfus, then to make the statement true, a net in this region has to be an obfuscated node (coming from a key-gate). If the third argument is obfus but preceded by ~, then to make the statement true, there has to exist a net in this region which is not an obfuscated node.

FANOUT <depth> <[~](name/obfus)>—It considers the fanout cone of the net under consideration up to a depth of depth. If the third argument is name and if any net in this cone has a name that starts with name, this statement is true. If name is preceded by ~, then the statement is true if there exists a net in this region that does not have a name that starts with name. If the third argument is obfus, then to make the statement true, a net in this region has to be an obfuscated node (coming from a key-gate). If the third argument is obfus but preceded by ~, then to make the statement true, there has to exist a net in this region which is not an obfuscated node.

LEVEL <depth> <[~](name/obfus)/number>—It considers all the nets within a depth of depth from the net being considered except those in the fanout cone. A depth of −1 means that all the nets except those in the fanout cone are considered. If the third argument is name and if any of these nets have a name that starts with name, this statement is true. If name is preceded by ~, then the statement is true if there exists a net in this region that does not have a name that starts with name. If the third argument is obfus, then to make the statement true, a net in this region has to be an obfuscated node (coming from a key-gate). If the third argument is obfus preceded by ~, then to make the statement true, there has to exist a net in this region, which is not an obfuscated node. If the third argument is a number, then if the region has at least number nets, the statement is true.

Statements Syntax

The syntax for the different possible statements for a consequent according to some embodiments are as follows:

REPORT <argument> <name/ALL>—Reports a metric for the net being considered. A valid metric is always between 0 and 1 and this helps the expert system to choose a net to obfuscate against an attack. In case of no REPORT statement in an antecedent-consequent block, the default value of the metric is −1. If the second argument is ALL, then a vector of metrics for all available nets is returned.

fanout: gives the number of nets in the fanout cone of the net normalized by the maximum value of this metric in the circuit.

fanout2: gives the number of primary outputs in the fanout cone of the net normalized by the maximum value of this metric in the circuit.

locality: gives the distance metric of the closest obfuscated net from the net being considered, the metric is normalized by the maximum depth of the circuit.

primInDist: gives the minimum distance of the net being considered from any primary input normalized by the maximum logic level of the circuit.

hybrid1: reports the sum of fanout and primInDist.

hybrid2: reports the sum of fanout2 and primInDist.

KEYGATE <X*R/MUX>—Notifies the expert system that the net under consideration is to be obfuscated with the second argument. X*R is the selection of either XOR or XNOR.

DUMMY INP <depth> <name/obfus/RANDOM> [number] (Required if KEYGATE MUX)—If the second argument is RANDOM, it reports the names of n random nets from depth of depth around the current net except those in the fanout cone, where n is random and less than or equal to number. If the second argument is name, it reports a net with the name starting with name from the same region. If the second argument is obfus, it reports an obfuscated net from the same region. A depth of −1 means that all the nets except those in the fan-out cone are considered. These nets are to be used as the dummy inputs to the MUX.

DUMMY FUN <RANDOM/SAT_HARD> <number> (Required if KEYGATE MUX)—If the second argument is RANDOM, it requests the expert system to use a function of input size less than or equal to number as the dummy function to the MUX. If the second argument is SAT_HARD, it requests the expert system to use a function of input size less than or equal to number from the set of SAT-hard functions as the dummy function to the MUX.

Training the Knowledge-Based Rules Selection Model

As previously noted, in particular embodiments, the learning-guided obfuscation framework 500 may include an expert system that makes use of a knowledge-based rules selection model that is configured as a machine learning model. Specifically, in some embodiments, the knowledge-based rules selection model may be a rules-based machine learning model. Accordingly, two modes of operation may be used within the learning-guided obfuscation framework 500 with respect to training the model. One mode of operation includes a frozen mode, in which the machine learning model is trained using pre-generated training sets. The other mode of operation includes an online mode, in which the model is updated during operation based at least in part on the system's efficacy.

Accordingly, FIG. 6 is a diagram 600 of the learning-guided obfuscation framework demonstrating training of the knowledge-based rules selection model configured as a machine learning model in accordance with various embodiments. In the frozen mode, the model in a training phase 630*a* is first trained using a set of pre-determined training designs 612 and a set of pre-determined attacks 614. In some embodiments, a first database 616*a* may be provided that includes strong design features, e.g., a set of design features that are robust against attacks, and a second database 616*b* may be provided that includes weak design features, e.g., a set of design features that break as a result of attacks, that are accessed during the training process. Each database 616*a*, 616*b* provides a set of design rules 640*a* to the model in the training phase 630*a*. Once the training phase 630*a* is completed, the model enters a locking (e.g., obfuscation) phase 630*b* in which the model initially goes through a supervised training process 620. Accordingly, in particular embodiments, the supervised training process 620 includes a second set of design rules 640*b* that, in some embodiments, may be the same as the first set of design rules 640*a*. The model in the locking phase 630*b* applies the second set of design rules 640*b* to a target design 650 to produce a locked design 660. A defense evaluator 670 may then evaluate the locked design 660 by applying one or more pre-determined attacks 614 to identify vulnerable key-gates and provide a defense metric 680 that can then be used by the expert system to re-lock (e.g., re-obfuscate) the target design 650 to address the vulnerable key-gates.

Alternatively, in some embodiments, the model is trained in an online mode that utilizes reinforcement learning. In these particular embodiments, the model is trained by the guidance of the defense metric 680, 690 sent as feedback to the model in the training phase 630*a* and/or in the locking phase 630*b*. Accordingly, the defense metric 680 provided during the locking phase 630*b* may be used to improve the quality of the model, as well as be used to re-lock (e.g., re-obfuscate) the locked design 660. Additionally, the defense metric 690 provided during the training phase 630*a* may be used to improve the quality of the model, as well as be used to re-generate the strong design features and the weak design features of the first and the second databases 616*a*, 616*b*, respectively.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Attack Sequence Generation Module

In various embodiments, an attack sequence is generated that may be used in evaluating a target hardware IP design. FIGS. 7A and 7B provide additional details regarding a process flow for generating an attack sequence according to various embodiments. FIGS. 7A and 7B are flow diagrams showing an attack sequence generation module for performing such functionality according to various embodiments of the disclosure. For example, the flow diagrams shown in FIGS. 7A and 7B may correspond to operations carried out by a processing element 410 in a computing entity 400, as it executes the attack sequence generation module.

Here, the process flow beings with categorizing the attacks into two groups based at least in part on a level of confidence each attack provides. The confidence level may refer to how likely an extracted key provided by a particular attack is a correct value for such an attack. Accordingly, in various embodiments, categorizing the attacks into a first attack group and a second attack group may involve applying each attack independently to the locked integrated circuit design. In particular embodiments, as each attack is applied, a correct key count for the locked integrated circuit design is incremented based at least in part on a comparison between an extracted key from the attack and an original key. Similarly, an incorrect key count for the locked integrated circuit design is also incremented based at least in part on the comparison between the extracted key from the attack and the original key.

Therefore, turning first to FIG. 7A, the process flow 700A begins with the attack sequence generation module providing an attack vector as first input, along with the number of attacks found in the vector, in Operation 712. In various embodiments, the attack vector contains the attacks and all their dependencies. In addition, the attack sequence generation module provides a locked benchmark integrated circuit design as second input in Operation 714. Accordingly, in particular embodiments, the locked benchmark integrated circuit design is diverse and large enough to represent different types of IPs. In addition, in some embodiments, the locking technique used to obfuscate the locked benchmark integrated circuit design may be the same technique used to perform the obfuscation on the target circuit. At this point, the attack sequence generation module applies each of the attacks independently in Operation 716 and checks the extracted key for each attack against an original key in Operation 718.

The attack sequence generation module continues with determining the number of correct and incorrect key values in Operation 720. Accordingly, in particular embodiments, some attacks may provide full or partial keys, while other attacks may provide a full-sized key but with some wrong key-bits. Here, the attack sequence generation module aims to separate those attacks into two groups based at least in part on the number of correct and incorrect extracted key values. Therefore, the process flow 700A continues with the attack sequence generation module separating the attacks into the two groups in Operation 722. Specially, this particular operation is carried out in various embodiments by determining which attacks have extracted keys, even partially, matching the original key. These attacks are added to the first attack group. While similarly, the attacks having extracted keys that do not match the original key are added to the second attack group.

Accordingly, the first attack group that includes those attacks that provide correct full or partial keys can be used with high confidence. While the second attack group that includes those attacks that provide incorrect keys (e.g., mistakes in the keys, in which the location of the mistakes may not be known) can be used with low confidence. In some embodiments, both groups are sorted according to the number of correct key values (key-bits) found in the extracted key for each attack.

Referring now to FIG. 7B, upon categorizing the attacks, the process flow 700B continues to generate the attack sequence as follows, the attack sequence generation module applies the attacks found in the first attack group 750 in Operations 752a, 754a, 756a on a locked integrated circuit design in a sequence, where the attack sequence generation module performs de-obfuscation in Operations 752b, 754b, 756b after each attack. Upon completion of the first attack group 750, the attack sequence generation module applies each attack of the second attack group 760 in Operations 762a, 764a, 766a to the de-obfuscated integrated circuit design generated from applying the attacks found in first attack group 750. Here, in particular embodiments, the attacks found in the second attack group 760 may be applied in parallel. In addition, the attack sequence generation module may perform a de-obfuscation in Operations 762b, 764b, 766b after each attack to generate a de-obfuscated integrated circuit design 772, 774, 776. At this point, in particular embodiments, the attack sequence generation module selects the attack sequence in Operation 780 that has produced the de-obfuscated integrated circuit design 772, 774, 776 in the de-obfuscated integrated circuit design set with the highest number of extracted keys. In some embodiments, if two attack sequences produce the same number of extracted keys, then the attack sequence generation module is configured to select both sequences.

After the attack sequence is generated, the sequence may be stored in various embodiments as the default sequence until a modification to the attack vector is applied. For instance, in particular embodiments, the attack sequence may be stored in the attacks and security evaluation tools database. In some embodiments, some attack sequences may be able to extract the full key even before the attack sequence is completed, in which case the attack process may be terminated. In addition, in some embodiments, a brute-force option may be provided if a remaining number of key-bits is below a threshold (e.g., twenty) after an attack sequence is completed, although in some instances a brute-force option may not be feasible for large circuits with a large number of input ports since all input sequences may be tested to ensure correct functionality.

Locking Process According to Various Embodiments

A process for locking a target hardware intellectual property (IP) accordingly to various embodiments is now discussed. For the discussion, the target hardware IP is an integrated circuit design. Here, the process involves using an attack sequence in performing a guided obfuscation of the target integrated circuit design by locking the target integrated circuit design and then evaluating the design using the attack sequence. In particular embodiments, this process may be performed over a number of iterations until the target integrated circuit design has been obfuscated to provide an acceptable level of protection against the attacks. Particular embodiments of the process may involve an attack evaluation module and an expert obfuscator module as further detailed herein.

Attack Evaluation Module

FIG. 8 provides additional details regarding a process flow for evaluating a locked (obfuscated) target integrated circuit design according to various embodiments. FIG. 8 is flow diagram showing an attack evaluation module for performing such functionality according to various embodiments of the disclosure. For example, the flow diagram shown in FIG. 8 may correspond to operations carried out by a processing element 410 in a computing entity 400, as it executes the attack evaluation module.

Accordingly, in particular embodiments, the attack evaluation module may receive as input a gate-level netlist associated with the target integrated circuit design and/or a key-size for locking the integrated circuit design. In some embodiments, the attack evaluation module may be configured to suggest a key-size based at least in part on the size of the target integrated circuit design. In addition, the attack evaluation module may receive a maximum number of iterations to perform to help limit the locking process of the target integrated circuit design in instances when obtaining an optimum obfuscation proves difficult. Likewise, the attack evaluation module may receive an attack timeout value. Other parameters that may be provided include the setting of a specific key value and/or prioritizing and/or excluding attacks.

The process flow 800 begins with the attack evaluation module locking the target integrated circuit design in Operation 810. Here, in particular embodiments, the attack evaluation module may perform this operation by invoking an expert obfuscator module for inserting all of the key-bits as key-gates into the target integrated circuit design. As described further herein, in particular embodiments, the expert obfuscator module is configured to randomly insert the key-gates into the target integrated circuit design on a first iteration, after which point the expert obfuscator module makes use of a set of rules to mitigate successful attacks on the target integrated circuit design found in the attack sequence in subsequent iterations.

Therefore, once the target design integrated circuit has been obfuscated, the attack evaluation module applies the first attack found in the attack sequence to the target integrated circuit design in Operation 815, at which point the attack evaluation module de-obfuscates any vulnerable key-gates in the design as a result of applying the first attack in Operation 820. The attack evaluation module then applies the second attack found in the attack sequence to the target integrated circuit design in Operation 825. Once the second attack has been applied, the attack evaluation module de-obfuscates any vulnerable key-gates in the design as a result of applying the second attack in Operation 830. Accordingly, in various embodiments the attack evaluation module performs the same Operations 835, 840 for each of the attacks found in the attack sequence.

At this point, the attack evaluation module determines whether the target integrated circuit design with the current obfuscation configuration has any vulnerable key-gates in Operation 845. In other words, in particular embodiments, the attack evaluation module determines whether any of the attacks found in the attack sequence were successful. Therefore, if the target integrated circuit design does have any vulnerable key-gates, then the attack evaluation module returns to Operation 810 and the target integrated circuit design is obfuscated again to attempt to address the key vulnerabilities. At noted, in particular embodiments, the target integrated circuit design may be obfuscated based at least in part on a set of rules that are configured to mitigate the successful attacks for each subsequent iteration.

Therefore, the process flow 800 shown in FIG. 8 may be carried out for multiple iterations until the target integrated circuit design has been obfuscated to provide an acceptable level of protection against the attacks found in the attack sequence. Accordingly, the acceptable level of protection may vary in different embodiments. For example, the attack evaluation module may be configured to perform iterations until the target integrated circuit design contains no vulnerable key-gates, one vulnerable key-gate, etc. In addition, a maximum number of iterations may be identified so that the attack evaluation module performs iterations until the target integrated circuit design has been obfuscated to provide an acceptable level of protection and/or until the maximum number of iterations has been performed.

Expert Obfuscator Module

FIG. 9 provides additional details regarding a process flow for locking (obfuscating) a target integrated circuit design according to various embodiments. FIG. 9 is flow diagram showing an expert obfuscator module for performing such functionality according to various embodiments of the disclosure. For example, the flow diagram shown in FIG. 9 may correspond to operations carried out by a processing element 410 in a computing entity 400, as it executes the expert obfuscator module. As previously mentioned, the expert obfuscator module may be invoked by another module in particular embodiments to lock the target integrated circuit design such as, for example, the attack evaluation module previously described. However, with that said, the expert obfuscator module may not necessarily be invoked by another module and may execute as a stand-alone module in other embodiments.

The process flow 900 begins with the expert obfuscator module determining whether the obfuscation of the target integrated circuit design involves a first iteration of locking the design in Operation 910. If so, then the expert obfuscator module inserts key-gates into the target integrated circuit design for the key-bits in Operation 915. Here, in particular embodiments, the expert obfuscator module may be provided with a gate-level netlist of the target integrated circuit design and a length of the key (e.g., key-size). Therefore, the expert obfuscator module may be configured to insert all of the key-bits as key-gates (e.g., XOR or XNOR key-gates) in the design at randomly chosen locations.

As previously discussed, in some embodiments, the expert obfuscator module may be configured to use a knowledge-based rules selection model. Here, the knowledge-based rules selection model may be used in the hopes that chosen locations might become robust against the attacks, thereby saving computational time and power. Therefore, for each iteration after the initial iteration, the expert obfuscator module in particular embodiments is configured to label each key-bit with respect to each attack in the attack sequence that has broken it during the attack phase, and this information is fed to the knowledge-based rules selection model.

Therefore, the process flow 900 continues with the expert obfuscator module considering a first key-bit in Operation 920. The expert obfuscator module then considers whether the key-bit is vulnerable to a first attack in the attack sequence in Operation 925. If so, then the expert obfuscator module identifies a list of candidate locations and key-gate types that may be used to address the vulnerability in Operation 930. Here, the expert obfuscator module may feed the vulnerability and corresponding information to the knowledge-based rules selection model and the model generates the list of candidate locations and key-gate types based at least in part on corresponding attack mitigation rules to mitigate the vulnerability. Accordingly, the knowledge-based rules selection model may be configured to scan through the nets in the netlist for the target integrated circuit design to identify nets for the key-gate that may provide robustness against the attack. In addition, the knowledge-based rules selection model may identify the type of obfuscation (e.g., key-gate type) for the identified nets.

As previously noted, in some embodiments, the knowledge-based rules selection model may be a machine learning model trained to shortlist a plurality of candidate locations and key-gates from a list of all suitable locations and key-gates. Here, the knowledge-based rules selection model may be trained in particular embodiments based at least in part on strong design features of integrated circuit designs found in a first database 616a and weak design features of integrated circuit designs found in a second database 616b. In some embodiments, the knowledge-based rules selection model is configured to determine mitigation techniques to be used to mitigate the attack, and to automatically update the first and the second databases 616a, 616b upon detecting a weak or robust design feature.

At this point, the expert obfuscator module determines whether every attack has been considered for the key-bit in Operation 935. If not, then the expert obfuscator module returns to Operation 925 and evaluates the key-bit based at least in part on the next attack found in the attack sequence. If each attack has been considered for the key-bit, then the expert obfuscator module determines whether the key-bit has been vulnerable to at least one attack in Operation 940. If the key-bit has been vulnerable to at least one attack, then the expert obfuscator module selects a location and key-gate type for the key-bit from the candidates in Operation 945 and inserts the key-gate at the selected location in Operation 950. Here, in particular embodiments, the expert obfuscator module is configured to select the location and key-gate type to provide a robustness against each of the attacks.

For instance, in particular embodiments, the expert obfuscator module may select a location (e.g., a net) for the key-bit following a set of heuristics. Here, the same net might appear as a candidate location for more than one attack. That is to say, there might be multiple instances of the same net in the list of candidate nets. To choose the net to obfuscate, the expert obfuscator module may be configured in some embodiments to sort the list of the nets based at least in part on the cumulative metric that is the sum of the metrics for all the occurrences of that net in the list. For example, if the size of the fanout cone is a metric for a net in one attack and its distance from the primary inputs is a metric in another attack, then the cumulative metric of that net would be the sum of both the metrics. In particular embodiments, the metrics may be normalized to a value between 0 to 1 so that there is no unwanted bias in the cumulative metric. In addition, metrics related to an attack may be defined in the consequent of its rules. For example, locality is appropriate for Hill-climb attacks since the closer the key-bits are the more robust is the netlist against a Hill-climb attack. While fanout is appropriate for SWEEP attacks since more corruptibility of outputs is better in that case. Accordingly, in particular embodiments, the expert obfuscator module may be configured to randomly select a net from the half of the list having nets with higher cumulative metric scores. As a result, a net that is robust to multiple attacks may get more preference for obfuscation. In addition, random selection may facilitate sparsity of key-gates across the netlist.

Once the net has been selected as the location to be obfuscated, the net may have different obfuscation techniques associated with different attacks that the key-bit was vulnerable to. Thus, in particular embodiments, the expert obfuscator module selects the obfuscation technique against the attack that has maximum priority (e.g., as defined by the user). For example, in some embodiments, the expert obfuscator module may be configured to be biased towards an XOR/XNOR based obfuscation technique, as well as the technique which occurs more, if multiple obfuscation techniques are prescribed for the attack.

The reason behind biasing XOR/XNOR in these embodiments is to add fewer dummy functions and obfuscate the overall circuits more. Obfuscated dummy functions get intrinsically mixed with the circuit. Here, the bias can be altered in some embodiments by repeating MUX based rules while writing the rules for an attack. Accordingly, due to the randomness inserted, the expert obfuscator module may choose an obfuscation technique that the rules did not prescribe for the chosen net. In that case, the expert obfuscator module may be configured to randomly select a net and obfuscate it with an XOR/XNOR key-gate. Further, overhead checks may also play a role in the key-gate insertion process, where a user-set limit can be applied. Finally, insertion of dummy functions can be limited in some embodiments to achieve a desired performance goal.

The expert obfuscator module then determines whether all the key-bits have been considered in Operation 955. If not, then the expert obfuscator module returns to Operation 920 and considers the next key-bit in the same manner as just described. Once all of the key-bits have been considered and the target integrated circuit design has been locked accordingly, the new design for the target integrated circuit design may be evaluated based at least in part on the attack sequence.

Alternative Locking Process According to Various Embodiments

An alternative process for locking a target intellectual property (IP) accordingly to various embodiments is now discussed. Again, the target IP is an integrated circuit design. For this process, an evaluation of the target integrated circuit design that has been locked is performed through the use of security evaluation tools to produce a key vulnerability matrix that is then analyzed to reconfigure the obfuscation of the target integrated circuit design to address any vulnerable key-gates identified in the matrix. Again, in particular embodiments, the process may be performed over a number of iterations until the target integrated circuit design has been locked to provide an acceptable level of protection against the attacks. Particular embodiments of the process may involve a learning-guided obfuscation module, a security evaluation module, and an expert locking module as further detailed herein.

Learning-Guided Obfuscation Module

FIG. 10 provides additional details regarding a process flow for evaluating and locking (obfuscating) a target integrated circuit design according to various embodiments. FIG. 10 is flow diagram showing a learning-guided obfuscation module for performing such functionality according to various embodiments of the disclosure. For example, the flow diagram shown in FIG. 10 may correspond to operations carried out by a processing element 410 in a computing entity 400, as it executes the learning-guided obfuscation module.

In various embodiments, the learning-guided obfuscation module is configured to iteratively locked the target integrated circuit design and assessed the design for vulnerabilities. Accordingly, the learning-guided obfuscation module in particular embodiments is configured to update a vulnerability history list $V_{hist}$ in every iteration, and use the list to guide performing a robust locking mechanism. In addition, as detailed further herein, the learning-guided obfuscation module may use an attack accuracy and weighted severity in performing an assessment that involves analyzing the obtained knowledge of vulnerabilities in the target integrated circuit design.

The process flow 1000 begins with the learning-guided obfuscation module receiving one or more inputs in Operation 1010. Similar to the attack evaluation module, in various embodiments, the learning-guided obfuscation module receives as input the gate-level netlist for the target integrated circuit design to be locked. In addition, the learning-guided obfuscation module may receive as input the following parameters: key-size, the maximum number of iterations, the attack timeout limit, and/or termination criteria. In some embodiments, the learning-guided obfuscation module may be configured to suggest the key-size based at least in part on the size of the target integrated circuit, but may also be specified by a user. The limit for attacks time-out in each iteration can be specified to help speed-up the evaluation process. Optional parameters may include setting a specific key value, prioritizing or excluding one or more attacks, de-obfuscation criteria, and/or limiting the overhead. De-obfuscation criteria may identify whether to remove vulnerable key-gates after applying each attack, or at the end of each iteration. Additionally, in some embodiments, a set of process termination flags may be specified, which can be a total time-out value, a hard limit of the number of iterations, and/or a desired security level threshold.

The learning-guided obfuscation module then locks the target integrated circuit design in Operation 1015. For instance, in particular embodiments, the learning-guided obfuscation module may insert key-gates (e.g., XOR/XNOR gates) into the target integrated circuit design by selecting the nets for the gates at random. Accordingly, the random insertion of the key-gates may serve as an initial baseline in order to detect vulnerabilities.

Next, the learning-guided obfuscation module performs a security evaluation of the obfuscated integrated circuit in Operation 1020. Accordingly, in particular embodiments, the learning-guided obfuscation module performs this operation by invoking a security evaluation module. As discussed further herein, the security evaluation module performs a thorough security assessment using available attacks and security evaluation tools stored in the attacks and security evaluation tools database. In particular embodiments, the security evaluation module returns output of the security assessment as a key vulnerability matrix. Accordingly, in some embodiments, the key vulnerability matrix is a two-dimensional binary array in which each row in the matrix represents a key-input, and each column represents an assessed attack. Equation 1 shows how the key vulnerability matrix may be expressed:

$$V_{km} = \begin{bmatrix} V_{11} & V_{12} & V_{13} & \dots & V_{1m} \\ V_{21} & V_{22} & V_{23} & \dots & V_{2m} \\ \vdots & \vdots & \vdots & \ddots & \vdots \\ V_{k1} & V_{k2} & V_{k3} & \dots & V_{km} \end{bmatrix} \quad (1)$$

where k is the number of key-inputs, and m is the number of attacks used in the evaluation. Each element in the matrix has two possible values (zero or one). For instance, if the value of the element $V_{xy}$ is zero, it indicates that key-bit x is not vulnerable to attack y, while a value of one means that key-bit x is vulnerable to attack y. When considering multiple iterations in some embodiments, a history of past $V_{km}$ values (e.g., $V_{hist}$) is considered the knowledge and is represented as $V_{hist}=V_{km}[n]$, where n is the number of iterations.

The learning-guided obfuscation module analyzes the learned vulnerabilities in the key vulnerabilities matrix for each key-gate. Accordingly, in particular embodiments, the learning-guided obfuscation module reads the key vulnerability matrix in Operation 1025, selects a key-input from the matrix in Operation 1030, and determines whether any vulnerabilities exist for the selected key-input (e.g., whether the vulnerability for any particular attack is set to one) in Operation 1035. If one or more vulnerabilities do exist for the key-input, then the learning-guided obfuscation module de-obfuscates the key-gate associated with the one or more vulnerabilities in the integrated circuit design in Operation 1040 and a new obfuscation of the target integrated circuit design is performed to address the vulnerabilities in Operation 1045.

Accordingly, in particular embodiments, the learning-guided obfuscation module inserts a new key-gate into the target integrated circuit design to address the vulnerabilities by invoking an expert locking module. As discussed further herein, the expert locking module extracts a set of rules from the attacks mitigation rules database based at least in part on the attack(s) causing the one or more vulnerabilities, uses the set of rules to identify possible solutions of key-gate type(s) and net location(s) to mitigate the attacks, selects one of the possible solutions, and obfuscates the target integrated circuit design accordingly.

At this point, the learning-guided obfuscation module determines whether another key-input is provided in the key vulnerabilities matrix in Operation 1050. If so, then the learning-guided obfuscation module returns to Operation 1030, selects the next key-input from the matrix, and performs the operations just described for the newly selected key-input. Once the learning-guided obfuscation module has processed all of the key-input in the matrix, the learning-guided obfuscation module performs another security evaluation on the obfuscated integrated circuit design in Operation 1055. Again, the learning-guided obfuscation module may perform this particular operation by invoking the security evaluation module.

In some instances, a key-gate may be found to be vulnerable to multiple attacks, and no suitable key-gate type and/or location can be found to meet all of the implemented attack mitigation rules. Therefore, in particular embodiments, the learning-guided obfuscation module may be configured to carry out an assessment that involves analyzing the obtained knowledge of vulnerabilities that quantifies the severity of each vulnerability. Accordingly, this assessment may be carried out by the learning-guided obfuscation module first generating an attack accuracy in Operation 1060. In various embodiments, the learning-guided obfuscation module generates the attack accuracy based at least in part on Equation 2:

$$Acc_m = \frac{\sum V_m}{\text{key\_size}} \times 100\% \quad (2)$$

where $Acc_m$ is the accuracy for attack m, $V_m$ is the number of key-gates that attack m has successfully extracted, and key_size is the total number of key-gates inserted in the circuit. In particular embodiments, the learning-guided obfuscation module is configured to obtain an accuracy value for each attack in each iteration and store the value in the knowledge $V_{hist}$ in each iteration. Accordingly, the set of attack accuracy values may be referred to as $Acc_m[n]$, where n is the number of iterations. To observe the severity of each attack for a given iteration, the learning-guided obfuscation module generates a severity metric (e.g., value) for each attack in Operation 1065 in particular embodiments based at least in part on the accuracy of the current and previous iterations as shown in Eqn. 3:

$$Sev_m[n] = \sum_{k=1}^{n} \frac{Acc_m[n]}{(n-k)+1} \quad (3)$$

where $Sev_m[n]$ is the severity metric for attack m in iteration n. The attack severity metric considers the weighted accuracy of the current and previous iterations, where the effect of older iterations is gradually reduced. Accordingly, the learning-guided obfuscation module then appends the severity metric for each attack to an attack severity list in Operation 1070. As further detailed herein, in the case of a key-gate with multiple vulnerabilities that causes a conflict, the attack mitigation rules for the attack with the highest severity metric value are applied in various embodiments with the other attacks with lower severity values being sorted, and their rules incrementally applied until the conflict occurs.

At this point, the learning-guided obfuscation module determines whether the termination criteria has been met in Operation 1075. If so, then the learning-guided obfuscation module exits and the final obfuscation configuration of the target integrated circuit design is completed.

Security Evaluation Module

FIG. 11 provides additional details regarding a process flow for evaluating a locked integrated circuit design to identify vulnerabilities according to various embodiments. FIG. 11 is flow diagram showing a security evaluation module for performing such functionality according to various embodiments of the disclosure. For example, the flow diagram shown in FIG. 11 may correspond to operations carried out by a processing element 410 in a computing entity 400, as it executes the security evaluation module. As previously mentioned, the security evaluation module may be invoked by another module in particular embodiments to evaluate the locked integrated circuit design such as, for example, the learning-guided obfuscation module previously described. However, with that said, the security evaluation module may not necessarily be invoked by another module and may execute as a stand-alone module in other embodiments.

The process flow 1100 begins with the security evaluation module reading the locked integrated circuit design in Operation 1110. The security evaluation module then performs each attack found in the attacks and security evaluation tools database. Therefore, the security evaluation module selects an attack from the database in Operation 1115 and applies the attack to the locked integrated circuit design in Operation 1120. As a result, an extracted key for the attack is obtained by the security evaluation module.

Next, the security evaluation module checks the extracted key by comparing the original key to the extracted one in Operation 1125. As previously noted, attacks may provide approximate keys in many cases, and some attacks may randomly select key values to apply. Therefore, embodiments of the security evaluation module are configured to consider any correctly guessed key as a vulnerability, even if the attack is believed to have obtained the key value using a non-reproducible approach. As a result, the security evaluation module is configured in some embodiments to consider the worst-case scenario when detecting vulnerabilities.

Once the security evaluation module has checked the extracted key, the security evaluation module appends the results of the check identified in a vector of values for each key-input as a column to the key vulnerability matrix in Operation 1130. As previously noted, the security evaluation module is configured in various embodiments to set the value for a particular key-input element as one if the key-bit is vulnerable to the attack and zero if the key-bit is not vulnerable to the attack.

In particular embodiments, a user is able to control the de-obfuscation process setting de-obfuscation criteria (e.g., a flag). Therefore, the security evaluation module determines whether the de-obfuscation criteria has been set to de-obfuscate any key-gates found vulnerable to the attack in Operation 1135. If so, then the security evaluation module de-obfuscates (e.g., removes) the vulnerable key-gates in Operation 1140.

At this point, the security evaluation module determines whether another attack is found in the attacks and security evaluation tools database in Operation 1145. If so, then the attacks and security evaluation tools database returns to Operation 1115, selects the next attack in the database, and repeats the operations just described for the newly selected attack. Once the security evaluation module has applied all of the attacks to the integrated circuit design, the security evaluation module returns the key vulnerability matrix as output in Operation 1150. Accordingly, the key vulnerability matrix can then be used to perform the obfuscation process on the target integrated circuit design in order to eliminate vulnerable key-gates.

Expert Locking Module

FIG. 12 provides additional details regarding a process flow for locking (obfuscating) a target integrated circuit design to address one or more vulnerabilities according to various embodiments. FIG. 12 is flow diagram showing an expert locking module for performing such functionality according to various embodiments of the disclosure. For example, the flow diagram shown in FIG. 12 may correspond to operations carried out by a processing element 410 in a computing entity 400, as it executes the expert locking module. As previously mentioned, the expert locking module may be invoked by another module in particular embodiments to lock (obfuscate) the target integrated circuit design such as, for example, the learning-guided obfuscation module previously described. However, with that said, the expert locking module may not necessarily be invoked by another module and may execute as a stand-alone module in other embodiments.

The process flow 1200 begins with the expert locking module reading the inputs in Operation 1210. Accordingly, in various embodiments, the inputs include the target integrated circuit design, the key-input to be used for obfuscation, and the attack severity list. The expert locking module is configured in particular embodiments to evaluate the outcome of the security evaluation conducted on the target design and rank each attack in terms of severity. Therefore, the expert locking module sorts the attacks found in the attack severity list based at least in part on their attack severity values from highest to lowest in Operation 1215. This particular operation is carried out in these embodiments so that the expert locking module addresses vulnerabilities that have a higher impact on the overall security and prioritizes inserting key-gates to mitigate attacks that are shown to have a higher impact than others.

Next, the expert locking module selects the first attack found in the sorted attack severity list in Operation 1220. The expert locking module then selects the attack mitigation rules corresponding to the selected attack from the attack mitigation rules database and appends the selected rules to a rules list in Operation 1225.

As previously noted, in particular embodiments, the attack mitigation rules may be written following a specific grammar that a knowledge-based rules selection model is able to capture and interpret. Therefore, in these particular embodiments, the expert locking module may be configured to make use of such a model that takes the selected rules as an input, and performs all the structural and functional analysis needed to interpret the rules and generates one or more possible design modification solutions that can mitigate the attack(s) under consideration in Operation 1230.

At this point, the expert locking module determines in Operation 1235 whether a conflict exists that would not allow for at least one solution to be identified. Accordingly, as the expert locking module continues to process the attacks from the sorted attack severity list, the expert locking module appends more attack mitigation rules that are accumulated in the rule list to address the different attacks considered from the list, and a new set of solutions are obtained. However, there is a possibility that for a given attack, the accumulated rules list will not provide any valid solution (e.g., empty solution set). This occurs if all the rules in the accumulated rules list are not applicable at the same time, which generates a conflict.

Therefore, if the expert locking module determines a conflict exists, then the expert module terminates processing the attacks found in the sorted attack severity list and a last valid set of design modification solutions is considered. However, if a conflict does not exist, then the expert locking module determines whether another attack is found in the sorted attack severity list in Operation 1240. If so, then the expert locking module returns to Operation 1220 and selects the next attack found in the sorted attack severity list and processes the newly selected attack in the same manner as just described.

At some point, the expert locking module either encounters a conflict for the current rules list or processes all of the attacks found in the sorted attack severity list. Accordingly, each of the possible design modification solutions found in the final valid set of solutions contains a locking key-gate type and location that is able to mitigate all the considered attacks. Therefore, once a conflict has occurred or all the attacks have been processed, the expert locking module selects one of the solutions found in the final valid set of possible design modification solutions as the solution to use in locking the target integrated circuit design in Operation 1245. Here, depending on the embodiment, the expert locking module may be configured to use some form of selection criteria or to simply select a solution from the set at random. Once selected, the expert locking module then obfuscates the target integrated circuit design by inserting the key-gate type at the location as indicated in the selected solution in Operation 1250. In case a dummy function is needed, the expert locking module may be configured to generate the function randomly, with the emphasis on making it similar to the size and structure of nearby functions and fan-in cones.

While some of the attacks found in the attack severity list may not be addressed in some instances, the expert locking module is configured in various embodiments to perform a robust locking scheme as the priority is set for more severe attacks. Additionally, vulnerabilities that are not addressed by the expert locking module in a given iteration may still be addressed in future iterations if their impact become more severe.

Accordingly, the object in various embodiments is to find and eliminate as many vulnerabilities as possible. Therefore, particular embodiments involve initiating using a simple locking mechanism (e.g., random insertion) that may be highly vulnerable. Then, the process continues by eliminating vulnerabilities in each iteration, and narrowing down the list of the optimum locking solutions. However, as more iterations are performed, less vulnerabilities may be found, and iterations may take longer to locate and mitigate less visible vulnerabilities. Therefore, in some embodiments, the process may be terminated when no attack is shown to provide a significant impact. However, two challenges may arise that might prevent the process from convergence: a) conflicting rules, and b) oscillating behavior. These challenges may be addressed in particular embodiments as follows:

For conflicting rules, if applying a rule R2 (for mitigating attack A2) causes the design to nullify the effect of R1 (for mitigating attack A1), then the expert locking module may determine that applying the rule sequence R1-R2 causes a conflict. Here, the framework is designed in various embodiments to avoid conflicts whenever such conflicts occur and complete the task of obfuscation within a minimal number of iterations. Accordingly, the expert locking module may be implemented in particular embodiments to avoid applying conflicting rules whenever possible. As the expert locking module analyzes attacks based at least in part on current and historical vulnerability analysis, the rules in the attack mitigation rules database are applied sequentially by prioritizing attacks with a higher impact on overall security. This approach can enable the framework to reach a solution that is at least able to mitigate the most impactful attacks while avoiding conflicting rules that cannot be applied simultaneously. In some instances, although such an approach for avoiding conflict can leave the design vulnerable to certain attacks at an intermediate state, multiple iterations and application of a different set of rules to different key-bits aim to provide a more comprehensive defense.

In addition, oscillation between two locked states can occur. For example, oscillating states may arise if the outcomes of iter[a] looks identical to iter[a+2], and iter[a+1] is similar to iter[a+3]. Accordingly, various embodiments of the expert locking module can reduce the likelihood of oscillating iterations by randomizing the selection of possible solutions, which can help provide a variety of design modification options for each iteration to choose from. While in some embodiments, the conflict check performed by the expert locking module can be modified by replacing the conflict check performed in Operation 1235 with a requirement for a minimum number of solutions. This solution threshold can help to ensure that the number of possible solutions provided by the expert locking module does not lead to oscillating iterations.

Implementation of Various Embodiments of the Framework

Implements of various embodiments of the learning-guided obfuscation framework are now discussed along with associated components. Here, the discussion of these embodiments is provided with respect to a set of benchmarks to demonstrate security and performance results. In addition, a comparison of the performance and security of embodiments of the framework to existing locking processes is provided. Accordingly, the implementation of the framework now discussed includes a set of common attacks and countermeasures that are intended to demonstrate various embodiments of the framework and their effectiveness. The following list outlines the logic locking techniques used in the comparison: Logic Cone Size (CS): nets are targeted with the largest cone size obtained by summing the number of gates in both fan-in and fan-out cones; Secure Logic Locking (SLL): nodes are selected based at least in part on the non-mutability factor, where inserted key-gates do not mask the effect of an existing key-gate in the netlist; and Random Insertion (RN): nets are randomly selected to use for the locking process, where biased or deterministic selections are avoided.

After selecting the candidate nets for obfuscation, key-gate insertion is performed. The locking mechanisms used in the implementation discussed is both MUX based key-gates and XOR/XNOR key-gates, where the key-gate type selection in each key-input is random. Dummy functions of MUX-based key-gates are chosen randomly, from other nets in the circuit, constants, randomly added logic gates, or primary ports. The list of attacks used in the analysis are the DPLL-based Boolean Satisfiability Attack (SAT), Key Sensitization Attack (KSA), Constant Propagation Attack (SWEEP), and Functional Hill-climbing Attack (Hill).

Attack Mitigation Rules

Rules for SAT: Since SAT was introduced, several countermeasures have been proposed to mitigate the attack. For instance, a SAT can be mitigated by inserting SAT-hard functions as the dummy input to a MUX key-gate. This slows down the SAT solver, which is present in SAT-based as well as SMT attacks. Obfuscating the SAT-hard functions can contribute to the overall SAT complexity of the original circuit. SAT-Hard functions may be randomly generated, where the size and shape of these functions should relatively look close to the original fan-in cone.

Accordingly, two approaches may be used in various embodiments to mitigate SATs. The first approach is to increase the number of iterations SAT requires to extract the key (targeting the attack algorithm). The second approach is to increase the complexity of the circuit such that each iteration takes longer to be resolved (targeting the SAT-solvers). In some embodiments, the latter approach is prioritized, as increasing the number of iterations causes the output corruptibility for incorrect keys to be very low (generates scope for AppSAT attacks). To increase the complexity of SAT solving, MUX-based key-gates with SAT-hard dummy functions may be inserted. SAT-hard functions (such as multipliers, stream ciphers, switch-boxes, hashing functions, and/or the like) can help to increase the runtime for the attack. Different SAT-hard functions of varied sizes and connectivity can be inserted. Table II shows examples of utilized SAT-Hard functions that may be used in various embodiments, their sizes, and attack complexity:

TABLE II

SAT-Hard Functions Used for SAT Attack Mitigation.

| Function | Inputs | Outputs | Gate Count* | SAT Attack Runtime ** (s) |
|---|---|---|---|---|
| 12-Bit Hashing Function [29] | 12 | 12 | 274 | 4278 |
| 14-Bit Hashing Function [29] | 14 | 14 | 324 | 16365 |
| 16-Bit Hashing Function [29] | 16 | 16 | 369 | 72136 |
| 12-Bit Multiplier [29] | 12 | 12 | 136 | 1472 |
| 14-Bit Multiplier [29] | 14 | 14 | 228 | 5884 |
| 16-Bit Multiplier [29] | 16 | 16 | 289 | 23538 |
| 18-Bit Multiplier [29] | 16 | 16 | 347 | 99236 |

*After optimization, using 250 nm LEDA technology library.
** Runtime for a single SAT iteration.

The SAT-hard function variants shown in Table II demonstrate the SAT resiliency in terms of attack complexity. The runtime is performed for a single SAT-hard function, and is measured per iteration. Analysis conducted on a 8000-gate benchmark demonstrated that a typical SAT on the benchmark can require 200-400 iterations before a key is found. For instance, assuming 18-bit SAT-hard functions are inserted in five locations, which adds around 1600 gates (or 20% power and area overhead). The attack complexity for this example is estimated at 4.7 years of runtime using a super-computer before a key is found at the $300^{th}$ SAT iteration. Therefore, using the listed SAT-hard functions can offer high resiliency against SATs. In addition, in particular embodiments, functions that aim to increase the number of SAT iterations can be utilized to can help increase the attack complexity by forcing the attack to repeat the solving process for an increased number of instances. Table III shows examples of functions that may be used in various embodiments that aim to increase SAT iteration count:

TABLE III

Functions that Exponentially Increase SAT Attack Iterations.

| Function | Inputs | Outputs | Gate Count* | Added SAT Iterations** |
|---|---|---|---|---|
| 20-Bit SARLock [30] | 20 | 1 | 311 | 1048575 |
| 22-Bit SARLock [30] | 22 | 1 | 326 | 4194303 |
| 24-Bit SARLock [30] | 24 | 1 | 412 | 16777215 |
| 20-Bit AntiSAT [31] | 20 | 1 | 364 | 1048577 |
| 22-Bit AntiSAT [31] | 22 | 1 | 473 | 4194305 |
| 24-Bit AntiSAT [31] | 24 | 1 | 562 | 16777217 |

*After optimization, using 250 nm LEDA technology library.
**Estimated based on the analysis in the function's original publication.

The examples in Table III show that adding SARLock or AntiSAT blocks across the circuit can exponentially increase the number of SAT iterations. When combining these functions with the aforementioned SAT-hard functions, a robust resiliency against SAT can be obtained in various embodiments. Building-up on the previous example, adding a 22-bit SARLock function to the circuit can increase the number of iterations required to break the circuit from 300 to 4194603. Therefore, the locked circuit is estimated to require more than 65,992 years of SAT runtime, at a roughly 25% power and area overhead. Accordingly, the analysis was conducted on a fairly small design, and the overhead decreases as the size of the circuit increases.

Rules for KSA: KSA relies on key-gates that can mute other key-gates and leak key values to output ports when specific input patterns are applied. To avoid this attack, various embodiments are configured to select key-gate locations that are distant from other inserted key-gates. This is achieved in some embodiments by maintaining a minimum distance threshold from the existing key-gates while selecting the location for a new key-gate. Additionally, MUX key-gates may be used, since KSA does not support this locking key type.

For example, to prevent KSA in particular embodiments, the learning-guided obfuscation framework may use a model configured to make all keys non-mutable (at least pairwise). If two obfuscated nets are input to the same gate, none of the keys can be propagated to a primary output without knowing the correct value of the other key. Thus, the learning-guided obfuscation framework in particular embodiments may be configured to require a keyword that scans through the nets, which are inputs to the gates to which the current net is also input. Another instance of non-mutability is if all inputs to a gate are obfuscated, its output can be obfuscated with a non-mutable key. Therefore, the learning-guided obfuscation framework defines another keyword in some embodiments that scans through the nets in the fan-in cone of the current net up to the depth specified by the user. However, this case can lead to a reduction in the key-space in some instances if the gate is XOR/XNOR. In such a case, all the key-bits can be simplified to one key-bit only. To take care of this unwanted situation, the framework in some embodiments defines yet another keyword which looks at the gate from where the current net originated. Note that the original circuit typically must have at least one obfuscated net for the KSA attack to work. For this reason, the learning-guided obfuscation framework may obfuscate the first key-bit randomly in particular embodiments when the attacks have completely de-obfuscated the netlist in that iteration.

Rules for Hill-Climbing Attacks: Functional hill-climbing considers logic locking as an optimization problem and the key-inputs as the optimization parameters. A high output corruption prevents any optimization from being achieved. Hence, various embodiments are configured to locate key-gates in places that cause high output corruptibility.

For example, to prevent Hill-climbing attacks, the learning-guided obfuscation framework in various embodiments follows a model configured to keep the key-gates close by since the attack fails with increasing density of key-bits. Accordingly, to check the fan-in cone as well as the fanout cone, a keyword is added in some embodiments to scan the fanout cone up to the depth of gates specified by a user. In some instances, the Hill-climb model may interfere with the KSA model by accidentally generating mutable key-gates in the process of keeping them close. To address this issue a higher priority may be given to protect against KSA than Hill-climb attacks. Accordingly, mitigations techniques for KSA brings key-bits closer, which can also facilitate defense against Hill-climb attacks. Further, placing key-gates in a cascade of XOR/XNOR gates for mitigating SAIL may cause a possibility of key-space reduction. However, this can be address in many instance by plugging in a suitable constraint.

Rules for SAIL: In various embodiments, the learning-guided obfuscation framework incorporates randomness in the size, as well as the type of dummy functions of the MUX key-gate, in anticipating a more powerful SAIL attack that can also decode MUX based logic locking. This randomness can hinder learnability arising from the deterministic nature of optimization techniques followed by the synthesis tool. Accordingly, in some embodiments, a keyword is tweaked to incorporate a depth attribute that allows it to check for such cascades up to that depth. In addition, another keyword is also incorporated in some embodiments that looks at the gate to which the current net terminates in a similar fashion. In some embodiments, the learning guided obfuscation framework may tend to choose the bigger cascade of XORs/XNORs/inverters since the locality metric for such a case is larger. In addition to the bubble pushing technique, the learning-guided obfuscation framework in particular embodiments also uses a hypergraph partitioning approach. The circuit is transformed into its hypergraph format, partitioned to smaller sub-circuits, and key-gates are inserted at the output of each partition. This approach helps distribute and the key-gates and helps to hide the structural representation of the original circuit.

Rules for SWEEP: This is a constant propagation attack that analyzes each key-input individually and establishes a correlation between the correct key value and the design parameters produced in the synthesis report. This attack focuses on MUX-based obfuscation. To prevent this attack, various embodiments are configured to randomized dummy functions in terms of size, the number of inputs, and shape. Dummy functions can be larger than the original fan-in cone in some instances, or smaller in other instances. Alternatively, XOR/XNOR gates may be used in some embodiments, since the attack is not able to break this type of key-gates.

Accordingly, for both SAT and SWEEP, the learning-guided obfuscation framework is configured in various embodiments to check whether enough nets are present to act as dummy inputs. For instance, in particular embodiments, a keyword can be used to check whether enough nets are present within a certain depth from the current net except for any net in its fanout cone. In addition, a check for a net with a particular name or an obfuscated net in that region can be performed. Further, keywords can also be used in particular embodiments to allow the insertion of dummy-functions as the other input to the MUX key-gates.

An example summary of attack mitigation rules that may be used in various embodiments of the disclosure is outlined in Table IV:

TABLE IV

A Summary of Attack Mitigation Rules According to Various Embodiments.

| Attack | Attack Mitigation Method | Preferred Key-Gates | Attack Mitigation Rules | Maximum Complexity |
|---|---|---|---|---|
| SAT | Insert Randomized Sat-Hard Functions | MUX | $\mathbb{R}_1 = \begin{cases} R_1^G[0]: \text{KEYGATE MUX} \\ R_1^G[1]: \text{DUMMYINP depth RANDOM} \\ R_1^G[2]: \text{DUMMY\_FUN SAT\_HARD inp\_size} \end{cases}$ | $\text{depth} \times \text{gates}_{total}$ |
| KSA | Select Nets that are Away from Other Key-Gates | MUX | $\mathbb{R}_2 = \begin{cases} R_2^G[0]: \text{KEYGATE MUX} \\ R_2^G[1]: \text{DUMMYINP depth RANDOM} \\ R_2^G[2]: \text{DUMMY\_FUN RANDOM} \\ R_2^L[3]: \sim\text{FANIN depth OBFUS} \end{cases}$ | $\text{depth} \times \text{gates}_{total}$ |
| Hill-Climbing | Select Nets with High Output Corruptibility | XOR/XNOR | $\mathbb{R}_3 = \begin{cases} R_3^G[0]: \text{KEYGATE X} * \text{R} \\ R_3^L[1]: \text{FANIN depth}_{max} \sim\text{OBFUS} \end{cases}$ | $\text{depth}_{max} \times \text{gates}_{total}$ |
| SWEEP | Randomize Type/Size of Dummy Functions | XOR/XNOR | $\mathbb{R}_4 = \begin{cases} R_4^G[0]: \text{KEYGATE X} * \text{R} \\ R_4^L[1]: \sim\text{LEVEL depth OBFUS} \end{cases}$ | $2 \times \text{depth} \times \text{gates}_{total}$ |

In this example, the attack mitigations rules database is $\mathbb{R}_{Database}=\{\mathbb{R}_1, \mathbb{R}_2, \mathbb{R}_3, \mathbb{R}_4\}$, where the considered attacks are SAT, KSA, Hill-Climbing, and SWEEP respectively. The rules were generated based at least in part on the mitigation approaches corresponding to each attack. A number of variables used in some rules may relate to design specific features. For example, $R_1^G[1]$ requires a specific depth value depth, which can be selected by a user. Increasing the value of depth can increase the number of possible design modification solutions, at the expense of increased locking-process runtime. $depth_{max}$ and $gates_{total}$ are constants that represent the maximum logic depth and the total number of gates in the design, respectively. In some embodiments, these constants can be automatically generated during the obfuscation process. The variable inp_size that is used in $R_1^G[2]$ relates to the number of inputs that the added dummy function uses.

The complexity analysis shown in Table IV for each set of attack mitigation rules demonstrates the worst-case scenario in terms of processing runtime for various embodiments. The quantitatively measured complexity represents the maximum number of processing cycles needed to apply the selected set of rules. It was observed that in some instances the implemented rules can be processed in polynomial time, where factors such as the total number of gates and maximum logic depth affect the processing runtime in a linear fashion.

Configurations and Test Setup

Synopsys Design Compiler has been used to generate the circuits. LEDA 250 nm standard cell library has been used for synthesis. ABC Compiler has also been used to perform some attacks (such as SAT and SWEEP). All analysis has been performed using a 6-core 4.3 GHz CPU and 32 GB of RAM. Embodiments of the framework are tested using the ISCAS85 benchmark suite, as well as other popular circuits. The implemented attacks vary in scalability and the level of offered key confidence, where some attacks provide full keys, while others provide partial keys. Moreover, the de-obfuscation flag previously described is set to allow the de-obfuscation process to be implemented after each attack. In addition, the termination criteria is set to 240-hours of runtime (per benchmark), a maximum of 20 iterations, and a desired maximum attack accuracy of less than 25%. SAT and hill-climbing attacks were set to timeout after ten hours.

Attack Accuracy Results

The learning-guided obfuscation framework according to various embodiments has been applied to the previously mentioned benchmarks. Locking parameters and benchmarks details, as well as the number of iterations after performing the framework, are shown in Table V.

TABLE V

Details for Benchmarks Used to Perform Framework

| Benchmark | # of Gates | Key Size | Iterations | Runtime (Hours) |
|---|---|---|---|---|
| c1355 | 546 | 16 | 4 | 65.26 |
| c1908 | 880 | 16 | 2 | 28.63 |
| c2670 | 1193 | 32 | 3 | 44.68 |
| c3540 | 1669 | 32 | 3 | 41.91 |
| c5315 | 2307 | 32 | 2 | 22.95 |
| c6288 | 2406 | 64 | 1 | 23.81 |
| c7552 | 3512 | 64 | 2 | 73.94 |
| ALU | 6601 | 64 | 5 | 113.57 |
| UART | 8025 | 64 | 4 | 96.32 |
| mem_ctrl | 11025 | 128 | 4 | 98.36 |

The accuracy results for each attack is displayed in the Table VI 1300 shown in FIG. 13 with respect to results for existing techniques 1310, 1315, 1320 and the framework according to various embodiments 1325. The attack accuracy metric $Acc_m$ is the percentage of successful key retrievals over the entire key-size. The results in the table show that no attack was able to extract a significant portion of the key. In other words, the accuracy is low enough to consider the obfuscation performed according to various embodiments of the framework robust against the considered attacks. FIG. 14 shows the attack accuracy 1400 of various benchmarks across the iterations performed using the framework according to various embodiments. FIG. 14 demonstrates that vulnerabilities in each iteration are addressed through the application of attack mitigation rules. The rapid spikes in attack accuracy results (such as in UART) indicate that more vulnerabilities were detected through the iterations by the security assessment performed in various embodiments, and hence the locking was modified to eliminate these weaknesses.

Output Corruption

In addition to the attack accuracy metric, functional analysis is performed to the locked circuit to ensure that the system is heavily corrupted when the key values are incorrect. This metric is calculated by performing a set of input patterns to the locked and the unlocked circuits, and the rate of unmatched outputs is calculated. This rate indicates how much output corruption the locking mechanism causes. Equations 4 and 5 show how the corruption metric is calculated:

$$C_{match} = \frac{O_{size} - [\text{Hamming}(O_{obj}, O_{golden})]}{O_{size}} \quad (4)$$

$$C_{corruption} = \frac{\sum_{k=1}^{P_{total}} (1 - C_{match}[k])}{P_{total}} \times 100\% \quad (5)$$

the matching rate $C_{match}$ is used to examine each input-output pattern. The golden output $O_{golden}$ is obtained from the unlocked circuit, while the output for the obfuscated circuit $O_{obf}$ is obtained after a randomly selected key is applied. The operation $\text{Hamming}(O_{obf}, O_{golden})$ performs the hamming distance calculation between the two obtained outputs, where the maximum Hamming distance value is $O_{size}$, which is the size of the output bus. The corruption rate $C_{corruption}$ is obtained by computing the sum of the mismatch rate, divided by the total number of applied input patterns $P_{total}$. The results in Table VII shows $C_{corruption}$ for the analyzed benchmarks when the incorrect key values are applied.

TABLE VII

Corruption Metric ($C_{corruption}$) Results

| Benchmark | CS | SLL | RN | LeGO |
|---|---|---|---|---|
| c1355 | 54.4 | 25.0 | 47.0 | 67.5 |
| c1908 | 54.7 | 22.3 | 35.4 | 85.8 |
| c2670 | 42.4 | 38.8 | 27.7 | 44.4 |
| c3540 | 63.3 | 35.4 | 41.6 | 73.7 |
| c5315 | 55.2 | 38.2 | 43.3 | 58.2 |
| c6288 | 49.6 | 37.6 | 37.7 | 66.9 |
| c7552 | 54.5 | 42.7 | 38.8 | 77.0 |
| ALU | 48.3 | 27.5 | 43.2 | 59.2 |
| UART | 63.2 | 49.3 | 36.2 | 63.4 |
| mem_ctrl | 41.2 | 36.2 | 47.3 | 60.8 |
| Average | 52.7 | 35.3 | 39.8 | 65.7 |

When comparing the corruption rates $C_{corruption}$ for various locking approaches, the framework (e.g., LeGO) according to various embodiments has the highest average value, while other locking techniques have a lower rate of corruption when the circuit is in the locked state.

SAT Attack Resiliency

The final circuit is evaluated by estimating the attack complexity in terms of the total number of required iterations, and the number of years required to find a valid key. To overview the security/overhead trade-off, three sets (Tiers) of locked circuits are generated based at least in part on SAT complexity targets. These tiers indicate the number of added SAT-hard functions to the circuit, where higher tiers provide higher SAT resiliency at the expense of increased performance overhead. These sets are referred to as tier 3, tier 4 and tier 5, where 6, 4, and 10 SAT-hard functions are inserted respectively. Part of the inserted SAT-hard functions (e.g., half) should aim to increase the SAT solving runtime (similar to functions in Table II), while the other part aims to increase the number of SAT iterations (similar to functions in Table III).

Overhead Analysis

The added key-gates and dummy functions may cause some performance overhead in certain embodiments, where a slight increase in area, power, and delay (critical path delay) is observed. The results in Table VIII 1500 found in FIG. 15 show the level of performance impact caused by the framework according to these embodiments; delay overhead has been constrained at 15%.

The results in Table VIII 1500 show that the combined average overhead for tier 3, tier 4 and tier 5 are about 33.0%, 54.4%, and 82.9% respectively. The estimations in Table VIII 1500 show that an exponential increase in attack complexity is expected as the number of SAT-hard functions increase. Moreover, the complexity also grows as the size of the circuit increases, which can impact the runtime period of each SAT iteration. Hence, the estimations suggest that a SAT does not cause a significant threat as long as the proper SAT-hard functions are incorporated. To better understand the trade-off of security and overhead in various embodiments of the framework, FIG. 16 shows SAT-resiliency and performance results 1600 across nine different tiers:

The analysis in FIG. 16 demonstrates how increasing the SAT-resiliency tier can exponentially increase the complexity for the attack. Moreover, the benchmarks used in the analysis are fairly small, and if a larger design is considered, the overhead may be extremely lower. Therefore, the framework in various embodiments is capable of achieving a balance between targeted security and overhead in an efficient and scalable manner. In some cases, the learning-guided approach can utilize features in the original functions to mitigate several attacks. For example, the c6288 benchmark is already too complex for SAT, which causes the overhead to be reduced significantly. Accordingly, embodiments of the framework can evaluate that and avoid adding unnecessary attack mitigation logic when the original circuit is already resilient to those attacks.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for obfuscating a hardware intellectual property (IP) design by locking the hardware IP design based at least in part on a plurality of key-bits, the method comprising:

performing a plurality of obfuscation iterations for the hardware IP design, wherein each of the plurality of obfuscation iterations comprises:
generating a key vulnerability matrix for a locked version of the hardware IP design and a plurality of attacks that comprises for each attack of the plurality of attacks:
applying the attack to the locked version of the hardware IP design;
determining whether the attack successfully extracted a correct key value for each key-bit of the plurality of key-bits; and
generating a vector for the key vulnerability matrix, the vector comprising a value for each key-bit of the plurality of key-bits identifying whether the attack successfully extracted the correct key value for the key-bit; and
for each key-bit of the plurality of key-bits:
determining whether the key-bit is vulnerable to at least one attack in the plurality of attacks based at least in part on the values found in the key vulnerability matrix for the key-bit; and
responsive to the key-bit being vulnerable to the at least one attack in the plurality of attacks:
de-obfuscating a key-gate used for the key-bit within the locked version of the hardware IP design;
removing the key-gate from the locked version of the hardware IP design;
identifying a set of design modification solutions to mitigate the at least one attack, wherein each design modification solution identifies a location within the hardware IP design and a key-gate type;
selecting a selected design modification solution from the set of design modification solutions; and
inserting the key-gate type to be used for the key-bit at the location identified by the selected design modification solution into the hardware IP design.

2. The method of claim 1, wherein identifying the set of design modification solutions comprises:

sorting the plurality of attacks into a sorted list of attacks based at least in part on an attack severity metric for each attack of the plurality of attacks from a highest attack severity metric to a lowest attack severity metric; and performing a plurality of solution iterations, wherein each of the plurality of solution iterations comprises:
selecting an attack from the sorted list of attacks, the selected attack having a next highest attack severity metric of the attacks remaining to be processed in the sorted list of attacks;
selecting one or more attack mitigation rules for the selected attack;
appending the one or more attack mitigation rules to a set of attack mitigation rules;

generating one or more possible design modification solutions based at least in part on the set of attack mitigation rules;
responsive to generating the one or more possible design modification solutions:
setting the one or more possible design modification solutions as the set of design modification solutions; and
responsive to at least one attack remaining to be processed in the sorted list of attacks, performing a next solution iteration of the plurality of solution iterations; and
responsive to not being able to generate the one or more possible design modification solutions, exiting from performing the plurality of solution iterations.

3. The method of claim 2 further comprising, for each attack of the plurality of attacks:
generating an accuracy for the attack for each of the plurality of obfuscation iterations performed, the accuracy based at least in part on a number of key-bits of the plurality of key-bits for which the attack successfully extracted the correct key value for the obfuscation iteration; and
generating the attack severity metric for the attack based at least in part on a weighting of the accuracy for the attack for each of the plurality of obfuscation iterations performed.

4. The method of claim 2, wherein generating the one or more possible design modification solutions based at least in part on the set of attack mitigation rules comprises generating the one or more possible design modification solutions by inputting the set of attack mitigation rules to a model configured to perform structural and functional analysis to interpret the set of attack mitigation rules, wherein the set of attack mitigation rules comprises one or more rules used by the model to identify the key-gate type for each possible design modification solution of the one or more possible design modification solutions and one or more rules used by the model to identify the location where to insert the key-gate type for each possible design modification solution of the one or more possible design modification solutions.

5. The method of claim 4, wherein the set of attack mitigation rules are configured in a grammar comprising a set of conditions and operators configured to support statements used to specify conditions for identifying the key-gate type and the location.

6. The method of claim 1 further comprising:
for each attack in a set of attacks:
applying the attack to a benchmark IP design; and
after applying the attack to the benchmark IP design:
determining whether an extracted key from applying the attack matches at least a portion of an original key used in locking the benchmark IP design;
responsive to the extracted key matching at least the portion of the original key, placing the attack into a first attack group; and
responsive to the extracted key not matching at least the portion of the original key, placing the attack into a second attack group;
applying each attack in the first attack group to the benchmark IP design sequentially, wherein a de-obfuscation is performed on the benchmark IP design after each attack in the first attack group is applied to the benchmark IP design;
applying each attack in the second attack group to the benchmark IP design in parallel after applying each attack in the first attack group, wherein a de-obfuscation is performed on the benchmark IP design after each attack in the second attack group is applied to the benchmark IP design to produce a de-obfuscated IP design for a set of de-obfuscated IP designs; and
generating the plurality of attacks comprising the attacks found in the first attack group and the attack found in the second attack group that produces the de-obfuscated IP design in the set of de-obfuscated IP designs having a highest number of extracted key-bits.

7. The method of claim 6 further comprising sorting the attacks of the first attack group according to a number of correct key-bits found in the extracted key associated with each respective attack of the first attack group.

8. An apparatus for obfuscating a hardware intellectual property (IP) design by locking the hardware IP design based at least in part on a plurality of key-bits, the apparatus comprising at least one processor and at least one memory including computer program code, the at least one memory and the computer program code configured to, with the at least one processor, cause the apparatus to at least:
perform a plurality of obfuscation iterations for the hardware IP design, wherein each of the plurality of obfuscation iterations comprises:
generate a key vulnerability matrix for a locked version of the hardware IP design and a plurality of attacks that comprises for each attack of the plurality of attacks:
apply the attack to the locked version of the hardware IP design;
determine whether the attack successfully extracted a correct key value for each key-bit of the plurality of key-bits; and
generate a vector for the key vulnerability matrix, the vector comprising a value for each key-bit of the plurality of key-bits identifying whether the attack successfully extracted the correct key value for the key-bit; and
for each key-bit of the plurality of key-bits:
determine whether the key-bit is vulnerable to at least one attack in the plurality of attacks based at least in part on the values found in the key vulnerability matrix for the key-bit; and
responsive to the key-bit being vulnerable to the at least one attack in the plurality of attacks:
de-obfuscate a key-gate used for the key-bit within the locked version of the hardware IP design;
remove the key-gate from the locked version of the hardware IP design;
identify a set of design modification solutions to mitigate the at least one attack, wherein each design modification solution identifies a location within the hardware IP design and a key-gate type;
select a selected design modification solution from the set of design modification solutions; and
insert the key-gate type to be used for the key-bit at the location identified by the selected design modification solution into the hardware IP design.

9. The apparatus of claim 8, wherein the at least one memory and the computer program code are configured to, with the at least one processor, cause the apparatus to identify the set of design modification solutions by:
sorting the plurality of attacks into a sorted list of attacks based at least in part on an attack severity metric for each attack of the plurality of attacks from a highest attack severity metric to a lowest attack severity metric; and performing a plurality of solution iterations, wherein each of the plurality of solution iterations comprises:
selecting an attack from the sorted list of attacks, the selected attack having a next highest attack severity metric of the attacks remaining to be processed in the sorted list of attacks;
selecting one or more attack mitigation rules for the selected attack;
appending the one or more attack mitigation rules to a set of attack mitigation rules;
generating one or more possible design modification solutions based at least in part on the set of attack mitigation rules;
responsive to generating the one or more possible design modification solutions:
setting the one or more possible design modification solutions as the set of design modification solutions; and
responsive to at least one attack remaining to be processed in the sorted list of attacks, performing a next solution iteration of the plurality of solution iterations; and
responsive to not being able to generate the one or more possible design modification solutions, exiting from performing the plurality of solution iterations.

10. The apparatus of claim 9, wherein the at least one memory and the computer program code are configured to, with the at least one processor, cause the apparatus to, for each attack of the plurality of attacks:
generate an accuracy for the attack for each of the plurality of obfuscation iterations performed, the accuracy based at least in part on a number of key-bits of the plurality of key-bits for which the attack successfully extracted the correct key value for the obfuscation iteration; and
generate the attack severity metric for the attack based at least in part on a weighting of the accuracy for the attack for each of the plurality of obfuscation iterations performed.

11. The apparatus of claim 9, wherein the at least one memory and the computer program code are configured to, with the at least one processor, cause the apparatus to generate the one or more possible design modification solutions based at least in part on the set of attack mitigation rules by generating the one or more possible design modification solutions by inputting the set of attack mitigation rules to a model configured to perform structural and functional analysis to interpret the set of attack mitigation rules, wherein the set of attack mitigation rules comprises one or more rules used by the model to identify the key-gate type for each possible design modification solution of the one or more possible design modification solutions and one or more rules used by the model to identify the location where to insert the key-gate type for each possible design modification solution of the one or more possible design modification solutions.

12. The apparatus of claim 11, wherein the set of attack mitigation rules are configured in a grammar comprising a set of conditions and operators configured to support statements used to specify conditions for identifying the key-gate type and the location.

13. The apparatus of claim 8, wherein the at least one memory and the computer program code are configured to, with the at least one processor, cause the apparatus to:
for each attack in a set of attacks:
apply the attack to a benchmark IP design; and
after applying the attack to the benchmark IP design:
determine whether an extracted key from applying the attack matches at least a portion of an original key used in locking the benchmark IP design;
responsive to the extracted key matching at least the portion of the original key, place the attack into a first attack group; and
responsive to the extracted key not matching at least the portion of the original key, place the attack into a second attack group;
apply each attack in the first attack group to the benchmark IP design sequentially, wherein a de-obfuscation is performed on the benchmark IP design after each attack in the first attack group is applied to the benchmark IP design;
apply each attack in the second attack group to the benchmark IP design in parallel after applying each attack in the first attack group, wherein a de-obfuscation is performed on the benchmark IP design after each attack in the second attack group is applied to the benchmark IP design to produce a de-obfuscated IP design for a set of de-obfuscated IP designs; and
generate the plurality of attacks comprising the attacks found in the first attack group and the attack found in the second attack group that produces the de-obfuscated IP design in the set of de-obfuscated IP designs having a highest number of extracted key-bits.

14. The apparatus of claim 13, wherein the at least one memory and the computer program code are configured to, with the at least one processor, cause the apparatus to sort the attacks of the first attack group according to a number of correct key-bits found in the extracted key associated with each respective attack of the first attack group.

15. A non-transitory computer storage medium comprising instructions for obfuscating a hardware intellectual property (IP) design by locking the hardware IP design based at least in part on a plurality of key-bits, the instructions being configured to cause one or more processors to at least perform operations configured to:
perform a plurality of obfuscation iterations for the hardware IP design, wherein each of the plurality of obfuscation iterations comprises:
generate a key vulnerability matrix for a locked version of the hardware IP design and a plurality of attacks that comprises for each attack of the plurality of attacks:
apply the attack to the locked version of the hardware IP design;
determine whether the attack successfully extracted a correct key value for each key-bit of the plurality of key-bits; and
generate a vector for the key vulnerability matrix, the vector comprising a value for each key-bit of the plurality of key-bits identifying whether the attack successfully extracted the correct key value for the key-bit; and
for each key-bit of the plurality of key-bits:
determine whether the key-bit is vulnerable to at least one attack in the plurality of attacks based at least in part on the values found in the key vulnerability matrix for the key-bit; and
responsive to the key-bit being vulnerable to the at least one attack in the plurality of attacks:
de-obfuscate a key-gate used for the key-bit within the locked version of the hardware IP design;

remove the key-gate from the locked version of the hardware IP design;

identify a set of design modification solutions to mitigate the at least one attack, wherein each design modification solution identifies a location within the hardware IP design and a key-gate type;

select a selected design modification solution from the set of design modification solutions; and insert the key-gate type to be used for the key-bit at the location identified by the selected design modification solution into the hardware IP design.

16. The non-transitory computer storage medium of claim 15, wherein the instructions are further configured to cause the one or more processors to at least perform operations configured to identify the set of design modification solutions by:

sorting the plurality of attacks into a sorted list of attacks based at least in part on an attack severity metric for each attack of the plurality of attacks from a highest attack severity metric to a lowest attack severity metric; and performing a plurality of solution iterations, wherein each of the plurality of solution iterations comprises:

selecting an attack from the sorted list of attacks, the selected attack having a next highest attack severity metric of the attacks remaining to be processed in the sorted list of attacks;

selecting one or more attack mitigation rules for the selected attack;

appending the one or more attack mitigation rules to a set of attack mitigation rules;

generating one or more possible design modification solutions based at least in part on the set of attack mitigation rules;

responsive to generating the one or more possible design modification solutions:

setting the one or more possible design modification solutions as the set of design modification solutions; and responsive to at least one attack remaining to be processed in the sorted list of attacks, performing a next solution iteration of the plurality of solution iterations; and responsive to not being able to generate the one or more possible design modification solutions, exiting from performing the plurality of solution iterations.

17. The non-transitory computer storage medium of claim 16, wherein the instructions are further configured to cause the one or more processors to at least perform operations configured to, for each attack of the plurality of attacks:

generate an accuracy for the attack for each of the plurality of obfuscation iterations performed, the accuracy based at least in part on a number of key-bits of the plurality of key-bits for which the attack successfully extracted the correct key value for the obfuscation iteration; and generate the attack severity metric for the attack based at least in part on a weighting of the accuracy for the attack for each of the plurality of obfuscation iterations performed.

18. The non-transitory computer storage medium of claim 16, wherein the instructions are further configured to cause the one or more processors to at least perform operations configured to generate the one or more possible design modification solutions based at least in part on the set of attack mitigation rules by generating the one or more possible design modification solutions by inputting the set of attack mitigation rules to a model configured to perform structural and functional analysis to interpret the set of attack mitigation rules, wherein the set of attack mitigation rules comprises one or more rules used by the model to identify the key-gate type for each possible design modification solution of the one or more possible design modification solutions and one or more rules used by the model to identify the location where to insert the key-gate type for each possible design modification solution of the one or more possible design modification solutions.

19. The non-transitory computer storage medium of claim 18, wherein the set of attack mitigation rules are configured in a grammar comprising a set of conditions and operators configured to support statements used to specify conditions for identifying the key-gate type and the location.

20. The non-transitory computer storage medium of claim 15, wherein the instructions are further configured to cause the one or more processors to at least perform operations configured to:

for each attack in a set of attacks:

apply the attack to a benchmark IP design; and after applying the attack to the benchmark IP design:

determine whether an extracted key from applying the attack matches at least a portion of an original key used in locking the benchmark IP design;

responsive to the extracted key matching at least the portion of the original key, place the attack into a first attack group; and responsive to the extracted key not matching at least the portion of the original key, place the attack into a second attack group;

apply each attack in the first attack group to the benchmark IP design sequentially, wherein a de-obfuscation is performed on the benchmark IP design after each attack in the first attack group is applied to the benchmark IP design;

apply each attack in the second attack group to the benchmark IP design in parallel after applying each attack in the first attack group, wherein a de-obfuscation is performed on the benchmark IP design after each attack in the second attack group is applied to the benchmark IP design to produce a de-obfuscated IP design for a set of de-obfuscated IP designs; and generate the plurality of attacks comprising the attacks found in the first attack group and the attack found in the second attack group that produces the de-obfuscated IP design in the set of de-obfuscated IP designs having a highest number of extracted key-bits.

21. The non-transitory computer storage medium of claim 20, wherein the instructions are further configured to cause the one or more processors to at least perform operations configured to sort the attacks of the first attack group according to a number of correct key-bits found in the extracted key associated with each respective attack of the first attack group.

* * * * *